(12) United States Patent
Foody

(10) Patent No.: US 8,458,706 B2
(45) Date of Patent: Jun. 4, 2013

(54) METHODS AND APPARATUS FOR PARALLEL PIPELINING AND WIDTH PROCESSING AND CONFIGURED TO PROCESS A MULTIPLE TASK PROCESSES APPORTIONED A DIFFERENT SECTION OF MEMORY

(75) Inventor: Patrick Foody, Birmingham (GB)

(73) Assignee: Neutrino Concepts Ltd., Birmingham, West Midlands (GB)

( * ) Notice: Subject to any disclaimer, the term of this patent is extended or adjusted under 35 U.S.C. 154(b) by 1471 days.

(21) Appl. No.: 11/968,130

(22) Filed: Dec. 31, 2007

(65) Prior Publication Data
US 2009/0144748 A1 Jun. 4, 2009

(30) Foreign Application Priority Data

Nov. 30, 2007 (EP) ..................................... 07254658

(51) Int. Cl.
*G06F 9/46* (2006.01)
*G06F 17/30* (2006.01)

(52) U.S. Cl.
USPC ........... 718/102; 718/100; 718/104; 718/107; 707/770

(58) Field of Classification Search
USPC ................................................. 707/636, 770
See application file for complete search history.

(56) References Cited

U.S. PATENT DOCUMENTS

| | | | |
|---|---|---|---|
| 5,857,180 A * | 1/1999 | Hallmark et al. ...................... | 1/1 |
| 6,304,866 B1 * | 10/2001 | Chow et al. ........................... | 1/1 |
| 6,502,136 B1 * | 12/2002 | Higuchi et al. ............... | 709/226 |
| 6,604,102 B2 * | 8/2003 | Klein et al. ........................... | 1/1 |
| 7,058,952 B1 * | 6/2006 | Garth et al. .................... | 718/105 |
| 7,177,874 B2 * | 2/2007 | Jardin ........................... | 707/714 |
| 7,895,231 B2 * | 2/2011 | Patterson ...................... | 707/770 |
| 2004/0098372 A1 * | 5/2004 | Bayliss et al. ..................... | 707/3 |
| 2004/0215639 A1 * | 10/2004 | Bamford et al. ............. | 707/100 |
| 2005/0114862 A1 * | 5/2005 | Bisdikian et al. ............. | 718/105 |

* cited by examiner

*Primary Examiner* — Meng An
*Assistant Examiner* — Tammy Lee
(74) *Attorney, Agent, or Firm* — James Trosino

(57) ABSTRACT

A computer apparatus is provided for use with a database management system. The computer apparatus is instructed to carry out a first task and a second task in series on a section of data, by: (a) instructing the first task process to begin the first task on a first part of the section of data in the database, and (b) after the first task process on the first part of the section of the data is complete, instructing the first task process to carry out the second task on the first part of the section of data on which the first task has already been carried out, or carry out the first task on the second part of the data, or pipeline the second task to a third task process, or carry out the first task on a second part of the section of data.

16 Claims, 18 Drawing Sheets

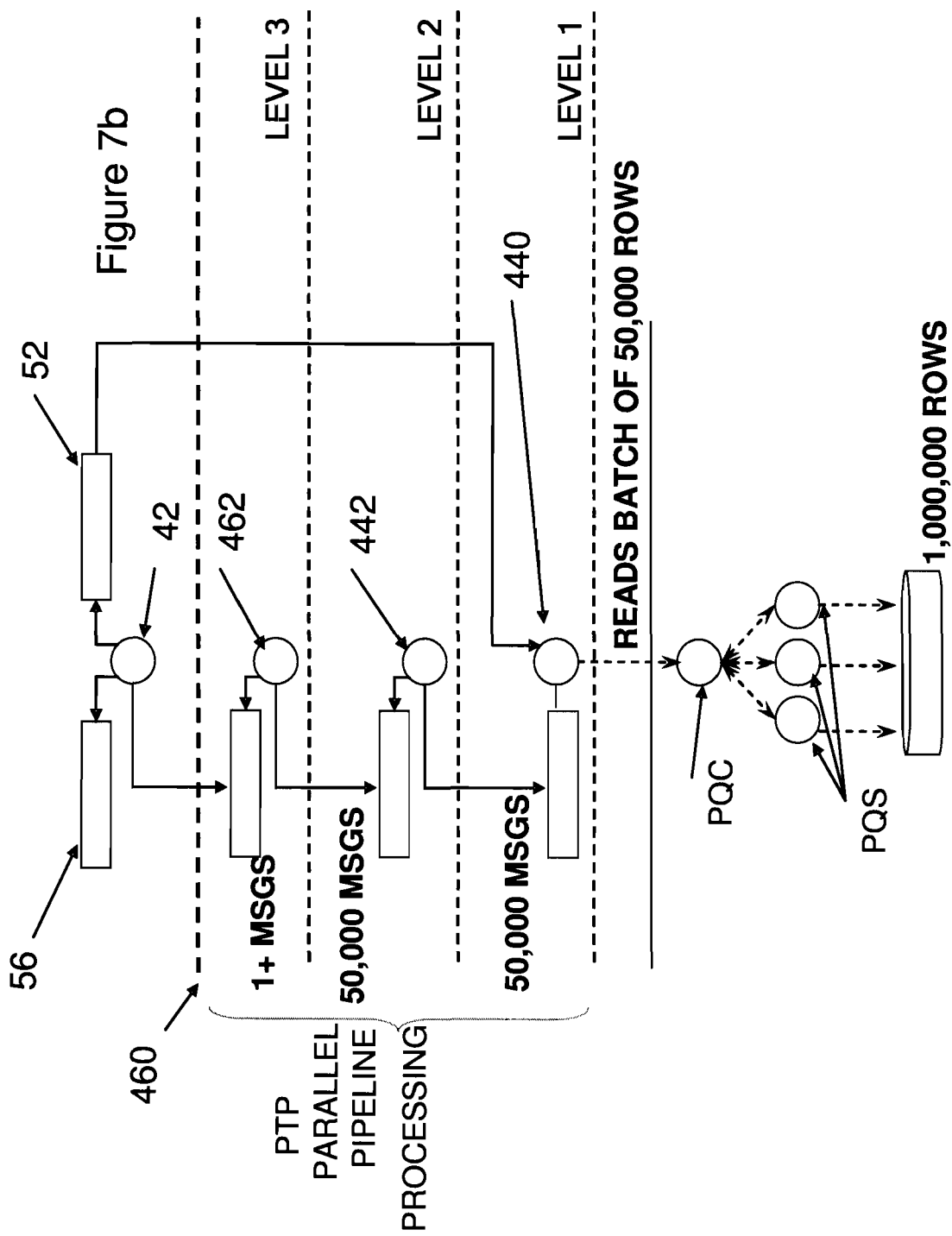

|  | PARALLEL TASK PROCESS 212 | PARALLEL TASK PROCESS 214 | PARALLEL TASK PROCESS 216 | PARALLEL TASK PROCESS 218 | PARALLEL TASK PROCESS 220 |
|---|---|---|---|---|---|
| 1ST OUTPUT QUEUE | 574 | 575 | 576 | 577 | 578 |
| 2ND OUTPUT QUEUE | 575 | 576 | 577 | 578 | 574 |
| 3RD OUTPUT QUEUE | 576 | 577 | 578 | 574 | 575 |
| 4TH OUTPUT QUEUE | 577 | 578 | 574 | 575 | 576 |
| 5TH OUTPUT QUEUE | 578 | 574 | 575 | 576 | 577 |

Figure 12

|  | PARALLEL TASK PROCESS 212 | PARALLEL TASK PROCESS 214 | PARALLEL TASK PROCESS 216 | PARALLEL TASK PROCESS 218 | PARALLEL TASK PROCESS 220 |
|---|---|---|---|---|---|
| 1ST OUTPUT QUEUE | 574 | 575 |  | 577 | 578 |
| 2ND OUTPUT QUEUE | 575 |  | 577 | 578 | 574 |
| 3RD OUTPUT QUEUE |  | 577 | 578 | 574 | 575 |
| 4TH OUTPUT QUEUE | 577 | 578 | 574 | 575 |  |
| 5TH OUTPUT QUEUE | 578 | 574 | 575 |  | 577 |

METHODS AND APPARATUS FOR PARALLEL PIPELINING AND WIDTH PROCESSING AND CONFIGURED TO PROCESS A MULTIPLE TASK PROCESSES APPORTIONED A DIFFERENT SECTION OF MEMORY

REFERENCE TO RELATED APPLICATIONS

This application claims priority from European Patent Application Serial No. 07254658.3, filed 30 Nov. 2007, which is incorporated by reference herein in its entirety.

BACKGROUND

This invention relates to a parallel processing system for a database management for a database management system.

It is known to provide a Relational Database Management System (RDBMS) hosting a database and to provide a query engine either as part of the RDBMS or remote from it allowing a user to make queries on and analyse the data in the database.

In order to increase the speed of querying it is known to provide the RDBMS with some parallel processing ability. These provide a certain number of processes with two or more simultaneously performing the same process such as reading data from the database to a hard disk of a user using the query engine in order that further processes can be carried out. Whilst this increases speed it is inflexible and wastes resources with all the parallel processes remaining on the query assigned until they have all finished their tasks, when some finish before others they simply sit idle. Accordingly there is a technical problem of answering queries still taking a considerable amount of data processing time. This problem is most notable with very large databases and/or when data sets are encrypted since the same processes performs reading and decryption with no parallel processing of reading and decryption.

SUMMARY

According to a first aspect of the invention there is provided computer apparatus for use with a database management system and database, the apparatus comprising a processor and a memory, the apparatus configured to provide at least two task processes, each task process being apportioned a different section of the memory when in use, wherein the apparatus is configured to respond to the database management system or apparatus being instructed to carry out a first task, such as reading, and a second task, such as decryption, in series on a section of data, by instructing the first task process to begin the first task on a first part of the section of data in the database and (preferably after a the first process on the first part of the section of the data is complete); instruct a second task process to carry out the first task on a second part of the section of data which begins where the first part ends, and when the first task is complete the first task process is switched to carry out the second task on data on which the first task has already been carried out, or instruct the second process to carry out the second task on the first part whilst the first process switches to carry out the first task on the second part of the data, or instruct the second task process to carry out the first task on a second part of the section of data the first task process is switched to pipeline the second task to a third task process, or instruct the first task process to carry out the first task on a second part of the section of data the second task process is instructed to pipeline the second task to a third task process.

According to a second aspect there is provided a method of using a database management system and a database, the method comprising using a processor and a memory to provide at least two task processes, each task process being apportioned a different section of the memory when in use, responding to the database management system or apparatus being instructed to carry out a first task, such as reading, and a second task, such as decryption, in series on a section of data, by instructing the first task process to begin the first task on a first part of the section of data in the database and (preferably after a the first process on the first part of the section of the data is complete); instruct a second task process to carry out the first task on a second part of the section of data which begins where the first part ends, and when the first task is complete switch the first task process to carry out the second task on data on which the first task has already been carried out, or instruct the second process to carry out the second task on the first part whilst the switching the first process to carry out the first task on the second part of the data, or instruct the second task process to carry out the first task on a second part of the section of data and switching the first task process to pipeline the second task to a third task process, or instruct the first task process to carry out the first task on a second part of the section of data and instruct the second task process to pipeline the second task to a third task process.

Preferably one or more and more preferably each task process has a task queue of tasks, the processor defines a governance queue comprising a list of tasks which the database management system has been instructed to carry out, the processor configured to assign tasks from the governance queue to the task queue of the first task process, the governance queue comprising the first and second tasks on the first part of the section of data, and when the first task has been carried out the first task process is configured to check its task queue and carry out the next task listed.

Preferably the processor defines a governance queue comprising a list of tasks which the database management system has been instructed to carry out, the processor configured to assign tasks from the governance queue to the first task process, the governance queue comprising the first and second tasks on the first part of the section of data. More preferably one or more task process has a task queue of tasks, the processor configured to assign tasks from the governance queue to the task queue of one or more task processes, one or more task processes are configured to split an assigned task into a plurality of smaller tasks, work on one smaller task and store the others in its task queue, and when a task has been carried out by a process, that process is configured to check its task queue and carry out the next task listed including any smaller tasks and/or each task process has a task queue of tasks, the processor configured to assign tasks from the governance queue to the task queue of one or more task processes, one or more task processes are configured to split an assigned task into a plurality of smaller tasks, work on one smaller task and store the others in its task queue, and when a task has been carried out by a process, that process is configured to check the task queue of another process and carry out the next task listed in that queue including any smaller tasks and/or the processor is configured to assign tasks from the governance queue to the task queue of one or more task processes, and when a task has been carried out by a process, that process is configured to check the governance queue and carry out the next task listed in that queue including any smaller tasks and/or when a task has been carried out by a process, the apparatus is configured to instruct that process whether it should check its task queue, the task queue of another process or the governance queue or to instruct which order those queue should be checked in, the process checking the next in order if there are no tasks listed.

Preferably one or more and more preferably each task process uses a cursor to indicate which data it has performed its task on and which data it has not and the one or more and preferably each task process comprises a cursor queue, configured to indicate the cursor position at at least one set time such as when a task/smaller task has been completed, and wherein the another process when instructed to carry out a similar type of task on the same section of data or results, reads the cursor queue of the process and the another process starts its task from the position at which the process's cursor stopped. More preferably the first task process uses a cursor to indicate which data has been read and which has not and the first task process comprises a cursor queue, configured to indicate when the first part of the section of data has been read where the first part of the data ends and the second part starts, and the second task process when instructed to read the second part of the same section of data, reads the cursor queue of the first task process and starts reading from the position at which the cursor of first task process cursor stopped.

Preferably one or more and more preferably each process comprises code for performing a plurality of different tasks, preferably including the first and second task. More preferably configured to activate/use the section of code corresponding to the task to be undertaken/the task assigned/instructed and preferably only that section.

More preferably the first task process is switched to carry out the second task a different section of code of the first task process is activated/used and/or when a task has been carried out by a task process, the code of the task process is used to instruct that process whether it should check its task queue, the task queue of another process or the governance queue or to instruct which order those queue should be checked in, the process checking the next in order if there are no tasks listed.

Preferably one or more and more preferably each task process comprises an administration queue, the one or more and preferably each task process is configured to check its administration queue for instructions. More preferably the apparatus is configured to send instructions to the administration queue of a task process when the task process is to be switched from a first task to a different task, such as from reading to decrypting, the process configured so that on reading such instructions in its administration queue it switches to the different type of task preferably by activation/use of a different section of code and/or wherein the apparatus is configured to send instructions to the administration queue of a task process when it is to be switched from working on a first part or section of data to a second part or section of data, the process configured so that on reading such instructions in its administration queue it switches the part or section of data on which it is working.

Preferably one or more and more preferably each process has an output queue in to which it outputs results of carrying out its task, the apparatus is configured to instruct a process to work on results from the output queue of another process. More preferably data comprises output results of carrying out a task and/or sends instructions to the administration queue of a task process when it is to be switched from working on a first output queue to a second output queue, the task process configured so that on reading such instructions in its administration queue it switches the output queue on which it is working.

Preferably a queue, such as the administration queue, of one or more and preferably each task process displays an available message when the task it is working on has been completed, and/or the apparatus is configured to provide a master administration queue associated with the governance queue, the one or more and preferably each task process sends an available message from that task process to the master administration queue when the task it is working on has been completed, the processor/integrator reads an available message from the queue and switches the task process to work on a task in parallel with another task that has already commenced work on the another task. More preferably a plurality of task processes comprise a progress queue which indicates the progress made by the task process on the task on which it is working, the apparatus is configured to determined which task to switch a task process signalled as available to a specific task to depending on the information in at least two progress queues of other task processes such as by switching to the task of a process that is less progressed its task.

The progress queue can be the cursor queue.

The progress queue can be additional to the cursor queue.

Preferably there are a plurality of task processes working on the same type of task on the same section of data such as reading the same section of data but different parts of the section of data.

Preferably the processes are organised into levels of processes (preferably at least three), the one or more process in the lowest level working on data in the database and/or from the database management system and the one or more process in higher levels working on results in the output queue of a process in a lower level preferably the directly lower level, so that task processes pipeline tasks. More preferably the processes are assigned a similar/the same type of task as processes on the same level and different to the type of task of task processes on a different level, such as an aggregating task process reading from a decrypting task process from a reading task process from the database, and/or checks each level, preferably starting from the lowest, for tasks for an available task process to assist another task process with in parallel and only checking the next level if there are no uncompleted tasks or sufficiently under progressed tasks and/or determines if a task is uncompleted by comparing stored information, such as in the memory, describing which task processes have been allocated to which task with what available messages are in queues and/or have been read from queues.

Preferably a task process signalled as available is sent a task from the governance queue.

Preferably there is an integrator configured to integrate results from at least one process, preferably by working on their output queues, to enable the integrated results to be read by a user querying the database management system. More preferably it is the integrator that comprises the master administration queue and/or performs any of the above steps of the apparatus or processor and/or the integrator is in a level higher than the task processes and preferably work on the output queue(s) of a plurality of task processes in the highest level of task processes and/or the integrator and/or at least one process comprises code for performing as an integrator and one or more tasks, preferably including the first and second task and/or the apparatus is configured to switch an integrator to be a task process or vice versa preferably depending on need and/or the integrator has an output queue in which is placed integrated results and/or there are at least two integrators integrating results from different task processes and a master integrator on a level higher integrating the results from the at least two integrators preferably by reading their output queues and preferably having its own output queue.

Preferably there is an output which transmits results, preferably from the output queue of an integrator or master integrator, such as to another computer.

According to an aspect of the invention there is provided a Computer system and comprising the above apparatus, a relational database management system.

Aspects of the invention may comprise a plurality of computers and processors.

BRIEF DESCRIPTION OF THE DRAWINGS

Embodiments of the invention will now be described, by way of example only, with reference to the following drawings in which:

FIG. 7b is an illustration of another pipelined stack of parallel task processes of the system of FIG. 3;

FIG. 11b is stealing matrix;

FIG. 12 is an adapted stealing matrix;

DETAILED DESCRIPTION

Figure 1:
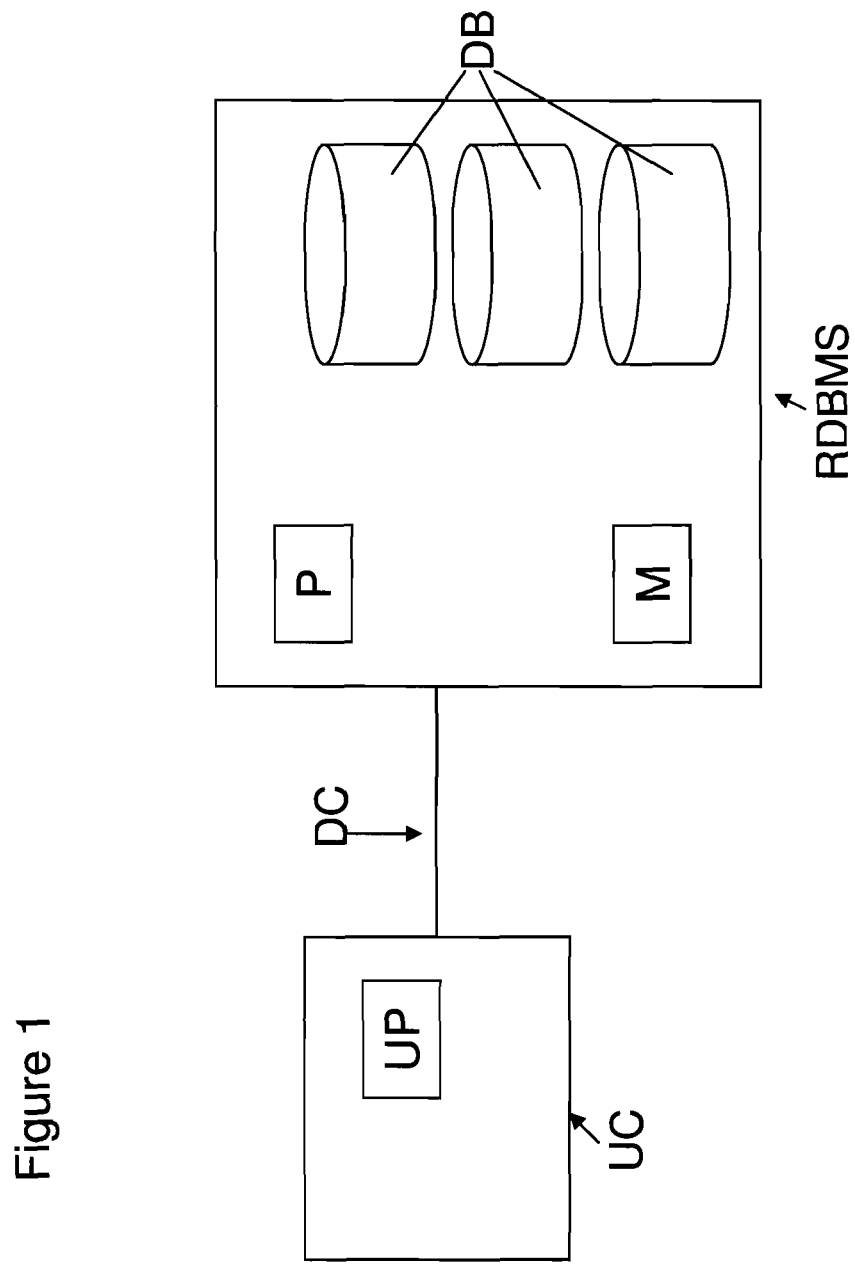
FIG. 1 is a schematic view of a known database system.

In FIG. 1 there is shown a Relational Database Management System RDBMS, a user presentation layer computer UC and a data connection DC.

The user presentation layer computer UC comprises a computer processing unit UP running presentation software and accessible by a user to ask queries or modify data.

The data connection DC can be any conventional data connector such as an Ethernet connection and will depend on the size and complexity of the system and the desired data transfer rate.

The Relational Database Management System RDBMS, such as Oracle® comprises a relational database DB, which may be stored on a single hard disc or over a number, a processing unit P, which may be a single processor or more likely a number of processors such as Massively Parallel Processor architecture, and a Random Access Memory M.

A user accessing the presentation layer computer UC can enter desired queries which the processing unit UP running the software translates into a form understandable by the management system RDBMS and sends the translated queries to the management system RDBMS via data connection DC. On receipt the management system RDBMS processes the queries and returns results to the user presentation layer computer UC via the data connection DC.

Figure 2:
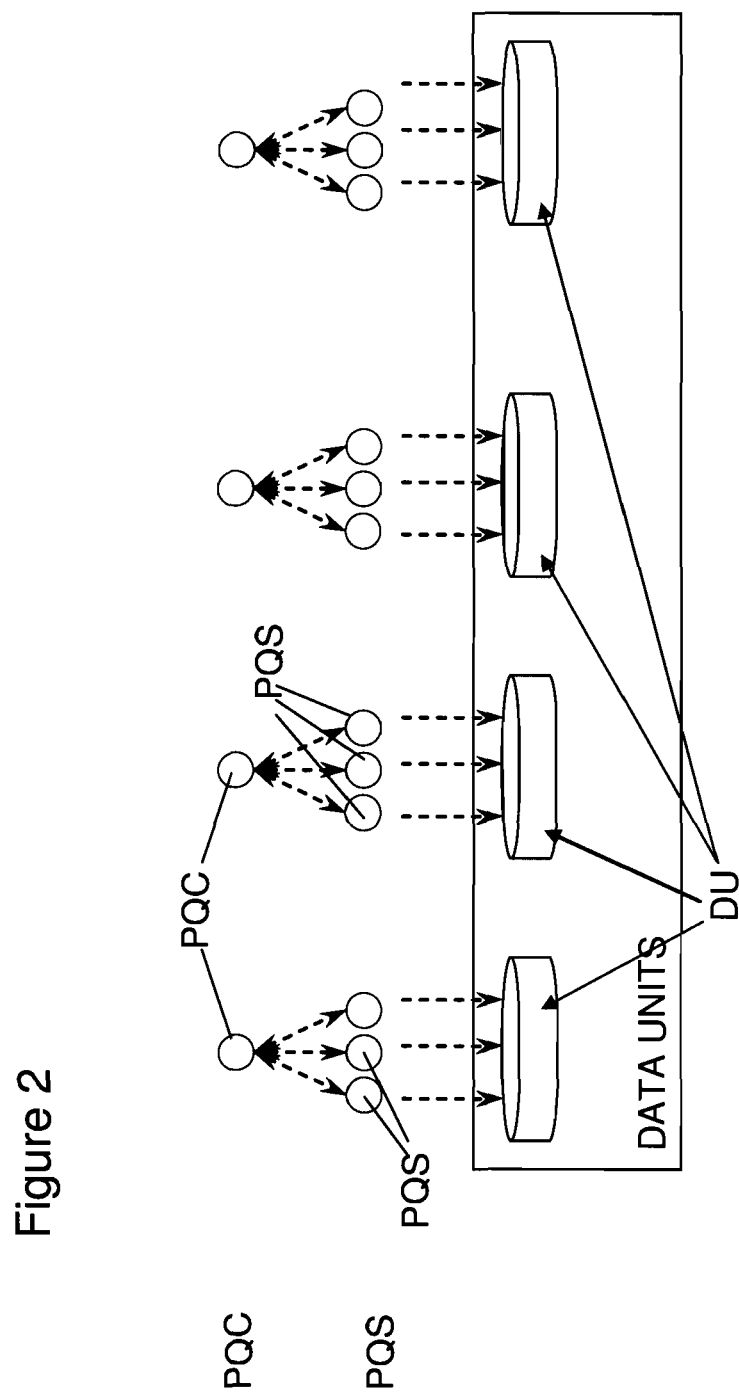
FIG. 2 is a schematic view of the allocation of processes in the system of FIG. 1.

In FIG. 2 is shown an example of part of the memory allocation of the management system RDBMS in use when prompted to undertake a query by the user presentation layer computer UC.

A number of task processes are generated which are constructed of lines of logic, and allocated a part of random access memory M to perform a task process as part of the query. There are two types of task process: Parallel Query Slaves PQS and Parallel Query Coordinators PQC.

As shown in FIG. 2 four data units DU of the database DB are being accessed. Each data unit DU is assigned a Parallel Query Coordinator PQC and three Parallel Query Slaves PQS. Each set of three Parallel Query Slaves PQS are assigned a task process such as to read data and work through this task process on their assigned data unit DU until it is completed. The processed data (such as read data) from each of the three is sent to the Parallel Query Coordinator which can merge the results. Once the task is completed by all the processes the set of three Parallel Query Slaves can be assigned a new task. If one of the three completes its work before the others it simply sits idly using memory M until the others finish. Once the tasks are completed the data merged by the coordinator PQC is sent to the presentation layer computer UC which converts the data into a form understandable to an end user.

Figure 3:
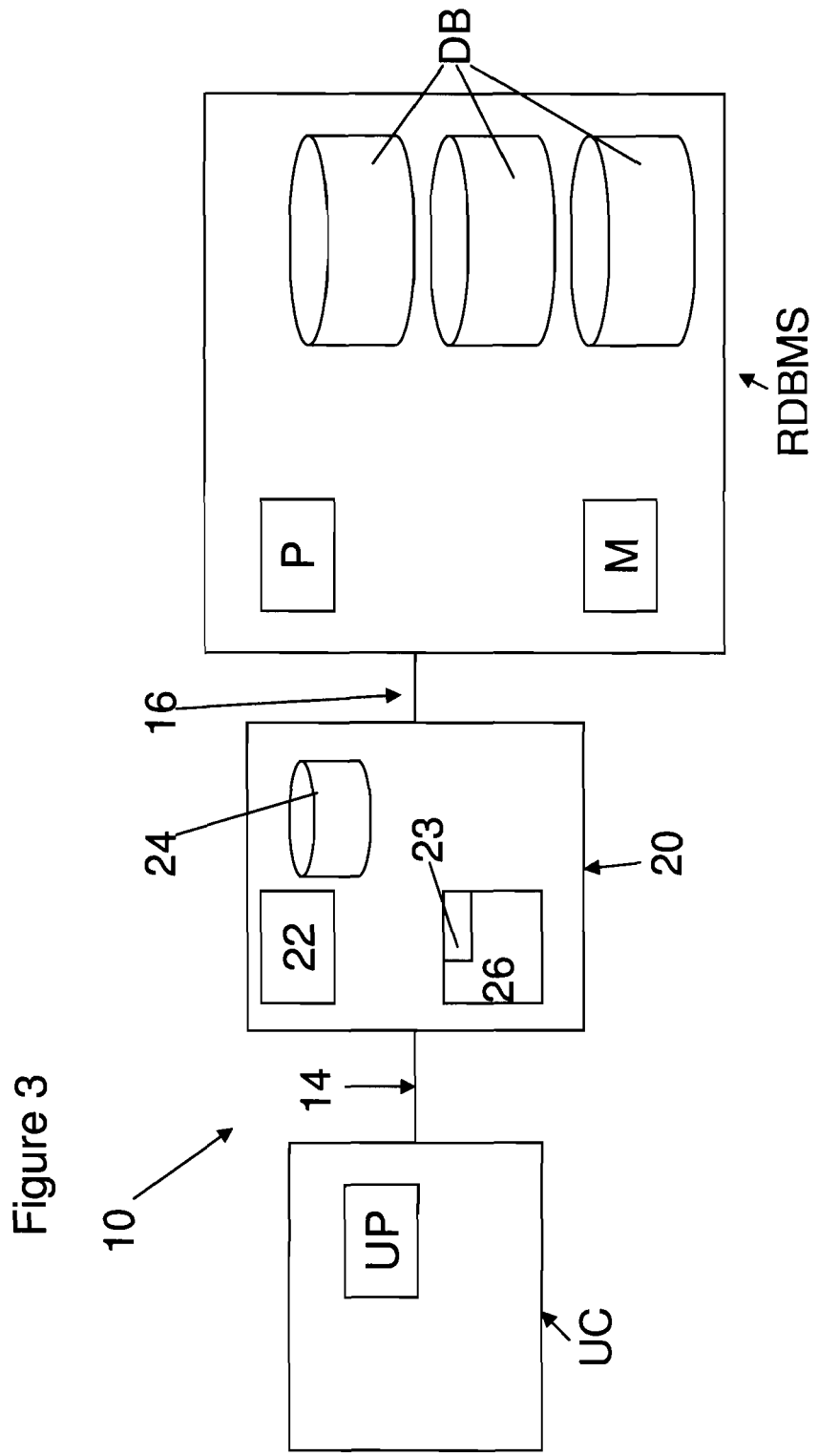
FIG. 3 is a schematic view of computer system in accordance with the invention.

In FIG. 3 is shown a computer system 10 comprising a Relational Database Management System RDBMS, a user presentation layer computer UC and an abstraction layer computer system 20. The abstraction computer system 20 sits between the a user presentation layer computer UC and Relational Database Management System RDBMS with data connections 14 and 16 to each and unlike the system S of FIG. 1 there is no direct link between the a user presentation layer computer UC and Relational Database Management System RDBMS. In other respects the Relational Database Management System RDBMS and a user presentation layer computer UC function in a similar manner to in FIG. 1.

The abstraction computer system 20 comprises a processing unit 22, a hard disk 24 and a random access memory 26. In the simplest example the abstraction layer system 20 may be housed on a single computer but in many real world system comprises a grid of hundreds of computers. The processors, RAM and disks of each computer combining together to collectively provide the processing unit 22, hard disk 24 and random access memory 26. Alternatively the abstraction computer system 20 can also comprise the RDBMS.

Figure 4:
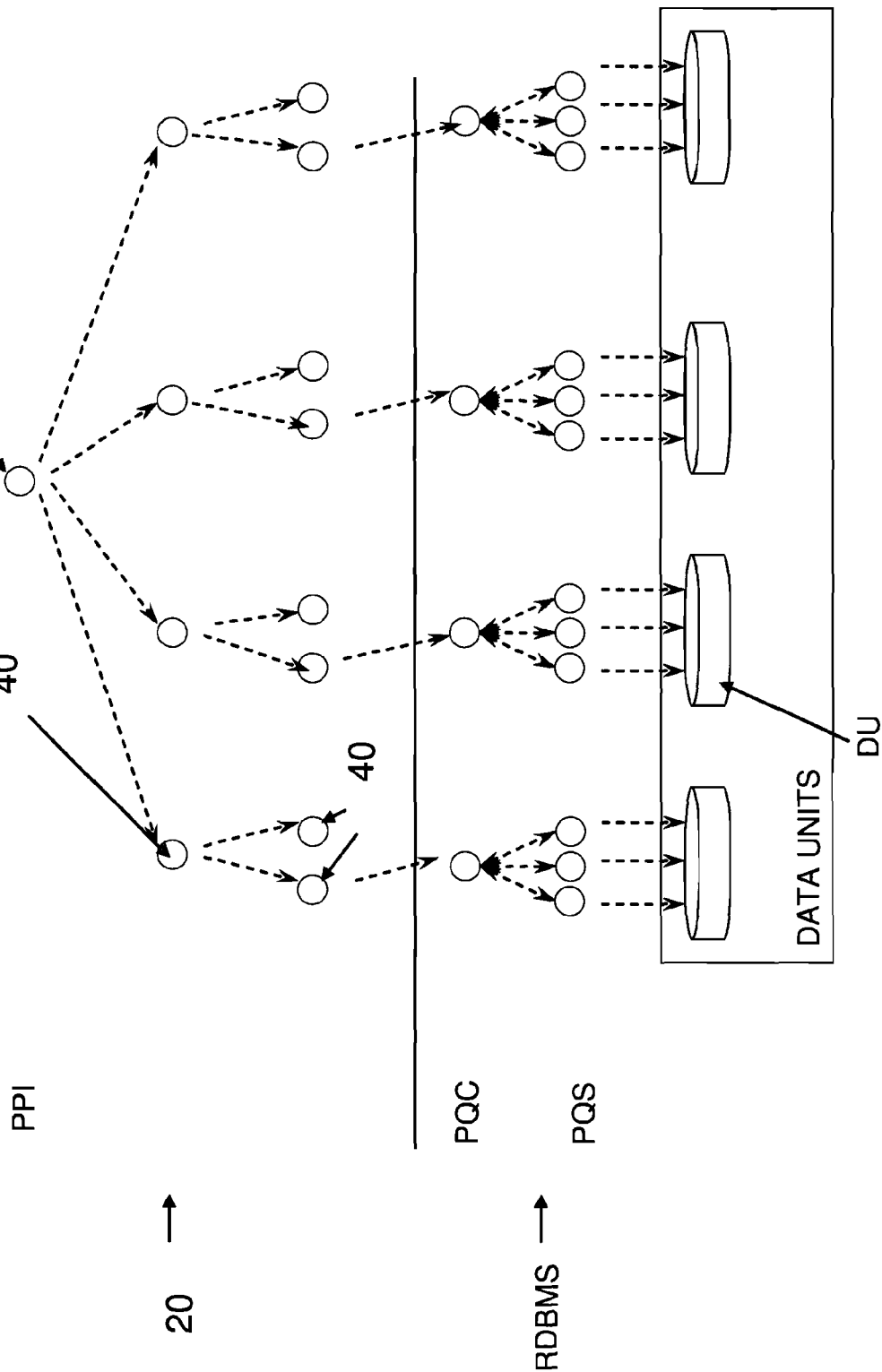
FIG. 4 is a schematic view of the allocation of task processes in the computer system of FIG. 3.

In FIG. 4 is shown an example of part of the memory allocation of the abstraction layer system 20 and the Relational Database Management System RDBMS. The Relational Database Management System RDBMS is set up in substantially the same manner as in FIG. 2.

The abstraction layer computer system 20 generates task processes comprising lines of logic assigned memory from memory 26 to exist and a memory space 23 for carrying out tasks. The part of system 20 illustrated comprises thirteen task processes comprising twelve parallel task processes 40 and one parallel processing integrator 42.

The parallel task processes 40 are computations, such as a read, decryption or aggregation, which can be executed.

These processes 40 can accept further inputs during and after they have been initiated. Each process comprises pre-programmed code and in the preferred embodiments includes sections of code for each potential function (such as read, decrypt etc) so that it is capable of each. Which section of code is used when then depend on what task it has been assigned to do. This allows any process 40 to be quickly converted between different types of task.

The Parallel Processing Integrators 42 fuses together the disparate outputs of the multiple task processes 40 to form the final query result set. In a preferred embodiment integrators 42 and task processes 40 may contain identical sets of code with the differences between them being which parts of the code they are instructed to use. This allows integrators 42 to become processes 40 and vice versa.

The depth of the processes 40 is determined by the parallel execution of the tasks this could encompass task process 40 to task process 40 parallelism as well as integrator 42 to integrator 42 parallelism or any combination thereof.

The integrators 42 are ready to deal with any task such as one generated to answer a query against the database DB. Each integrator 42 has a its own thread and memory space 23 in the random access memory 26.

Figure 5:
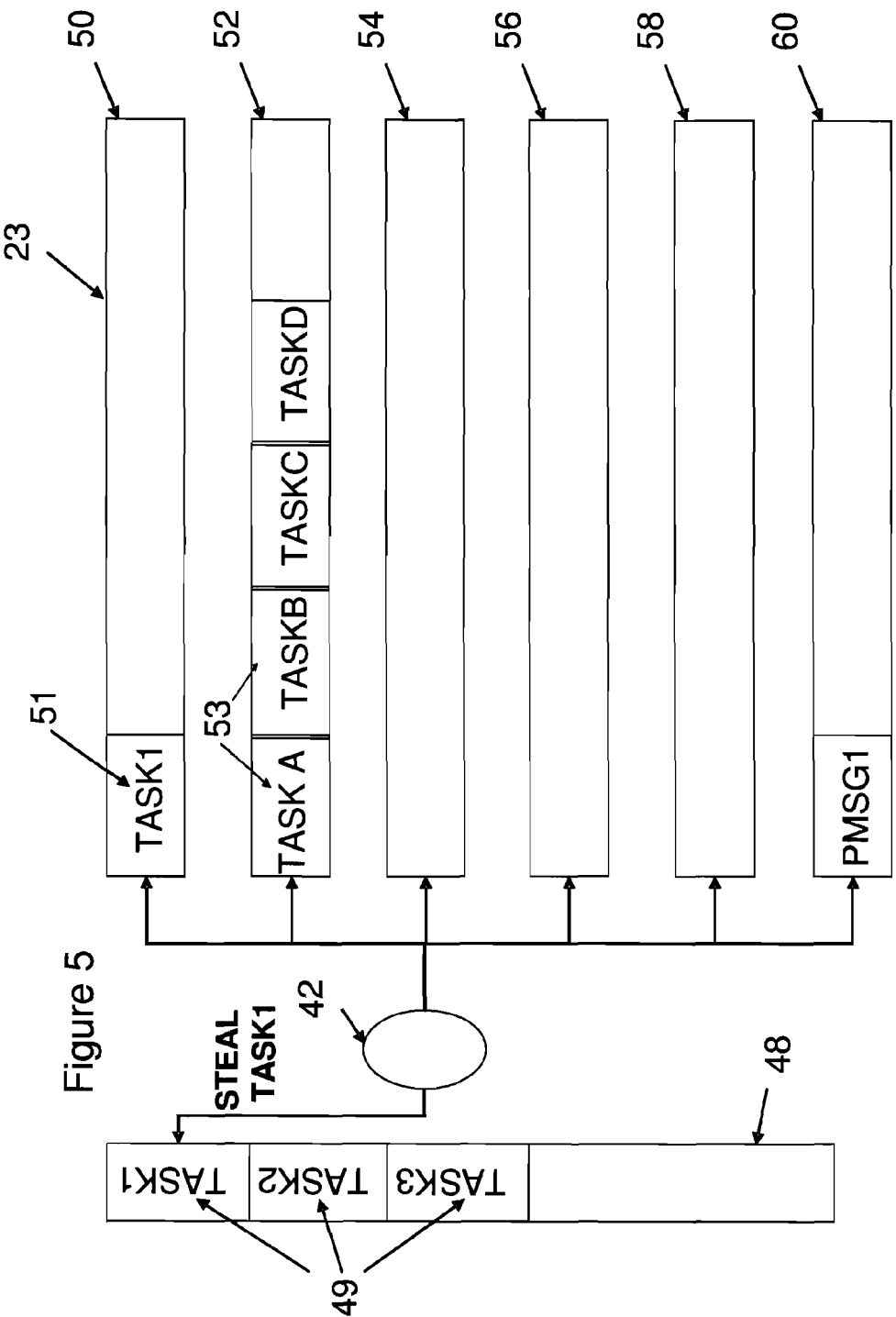
FIG. 5 is an illustration of the memory space of a parallel processing integrator of the system of FIG. 3.

An integrator's memory space 23 is depicted in FIG. 5 together with the associated integrator 42 and a task governance queue 48.

The governance queue includes all the tasks 49 that make up the query received from the presentation layer UC and is accessed by a number of parallel processing integrators 42.

The memory space 23 includes a number of task queues for inter-process communications an admin queue 50, a task queue 52, a cursor queue 54, an output queue 56, and alert queue 58 and a progress queue 60. Each of the queues include a number of tasks to be assigned 51.

Admin Queue 50 is an administration queue where administrators using the user presentation layer computer UC with adequate security clearance can communicate with specific integrators 42 and task processes 40 by inserting admin tasks 51 into the admin queue 50. Some examples of the types of instructions that can be communicated are PAUSE, KILL, STOP, and GET STATISTICS.

Task queue 52 is a queue of tasks 53. Tasks 53 can be allocated to an integrator 42 or more frequently to a task process 40. These tasks are available to all task processes 40 assigned to the integrator 42 owning the memory space 23.

Cursor Queue 54 enables integrators 42 or processes 40 to pass cursors to each other. This enables a task to be continually be processed by subsequent integrators 42 or task processes 40, whilst the previous task owner performs some data processing functionality. For example if a process 40 is instructed to read data and then decrypt the cursor will keep pace with what data has been read by the process 40. The location of the cursor can be put into a cursor queue accessible by another process so that if another process is instructed to read data whilst process 40 decrypts it can do so from where process 40 stopped allowing fro a continuous read without any duplication. This can be implemented with an Oracle based system by using the ability to open a cursor variable.

Output Queue 56 facilitates inter-process communication between the integrator 42 and its allocated task processes 40 or any other sub-processes that are being co-ordinated by the integrator 42. The results of the tasks completed by the assigned task processes 40 (such as read encrypted data or decrypted or aggregated data) populate this output queue 56. The results of this output queue can be sent to the user presentation layer computer UC.

Alert Queue 58 contains pre-defined alerts that can communicate with specific integrators 42 and task processes 40, for instance a new dimension data load may have just occurred. Depending on the type of alert a task process 40 will take some form of action after noticing an alert in the queue 58 of its assigned integrator 42, for example in the case of a new version of a dimension then all current memory resident versions, where necessary, will be superseded with the latest structure.

Progress Queue 60 facilitates inter-process communication of the progress of tasks between the integrator 42 and its allocated process 40 or any other sub-processes that are being co-ordinated by the integrator 42 or task process 40. In the example in FIG. 5 the first message (PMSG1) has informed the system 10 and possibly the user presentation layer UC that the process has begun, subsequent messages can give evidence of completion and time to complete. At the user presentation layer computer information from this progress queue 60 can be used to display status such as by a conventional status loading bar.

Each of the other queues of the integrator 42 and of the associated task processes 40 can be interrogated (automatically over a given period of time or in real-time on-demand when the user has inserted a message in the progress queue 60 and the queue has been checked) in order to provide up to date information of the status of a given task or the status of a given process 40 or integrator 42.

Figure 6:
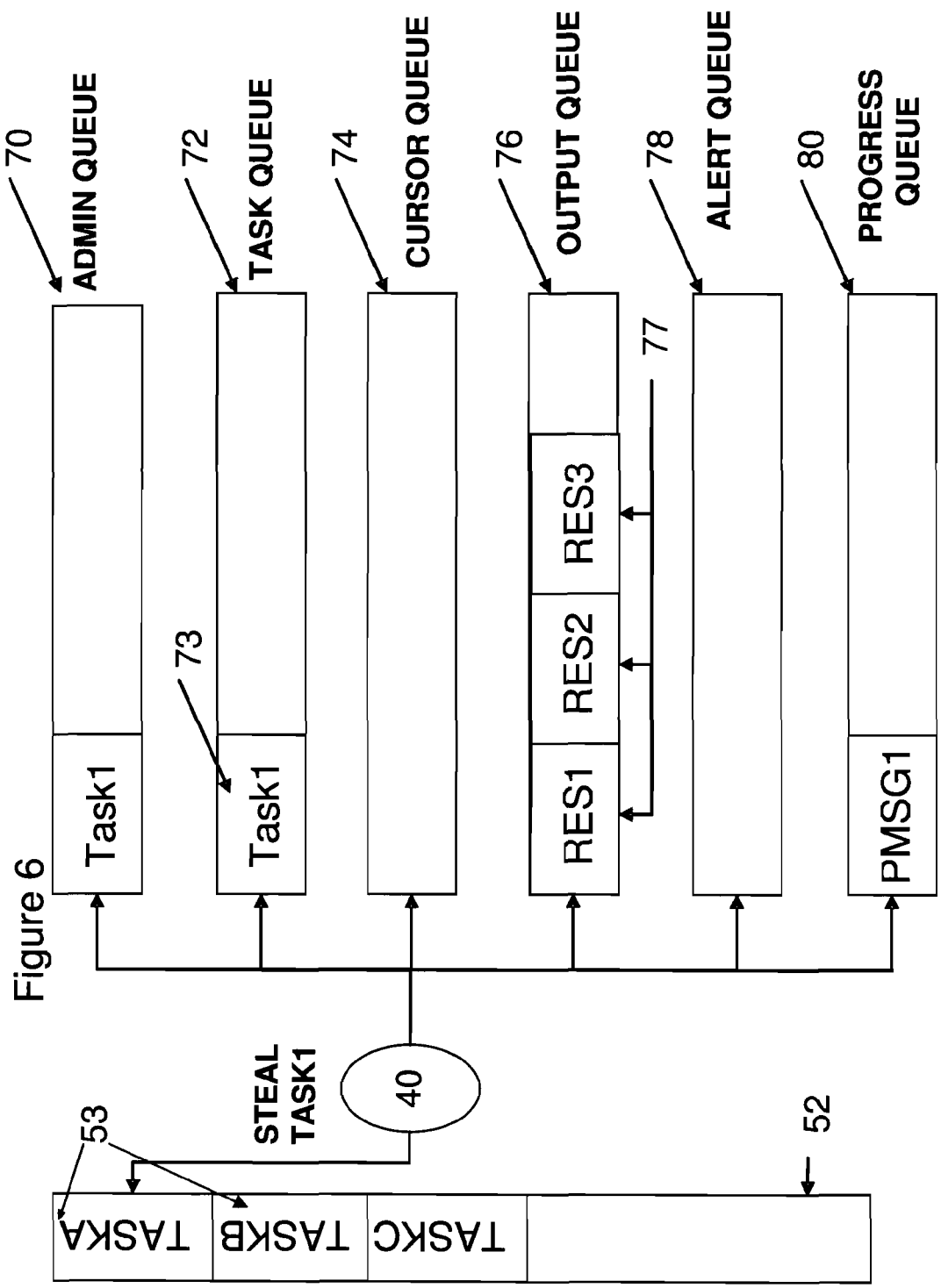
FIG. 6 is an illustration of the memory space of a parallel task processor of the system of FIG. 3.

A task process's 40 memory space 25 is depicted in FIG. 6 together with the associated task process 40 and an integrator task queue 52.

The memory space 25 includes a number of task queues for inter-process communications: an admin queue 70, a task queue 72, a cursor queue 74, an output queue 76, and alert queue 78 and a progress queue 80 substantially similar in function and form to queues 50 to 60 of integrator 42 as depicted in FIG. 5.

The output queue 76 contains the results 77 of a task 53 after it has been completed by the task process 40 such as decrypted data.

Whenever a process completes a task 73 from its task queue 72 it can "steal" another task from the parallel processing integrator 42's task queue 54 or if the task queue 54 is empty it can be made temporarily available to other integrators as described below a to help with functional processing of data or alternatively it can be placed back into a parallel task process pool.

The abstraction layer computer system 20 can create a stack of parallel task processes 40 to enable use of depth pipelining. Each process that is higher than another task process 40 lower down in the stack accessing the lower's output queue 76 and the data contained in it rather than the database DB directly. Each task process 40 in the stack is assigned different data processing tasks.

Figure 7A:
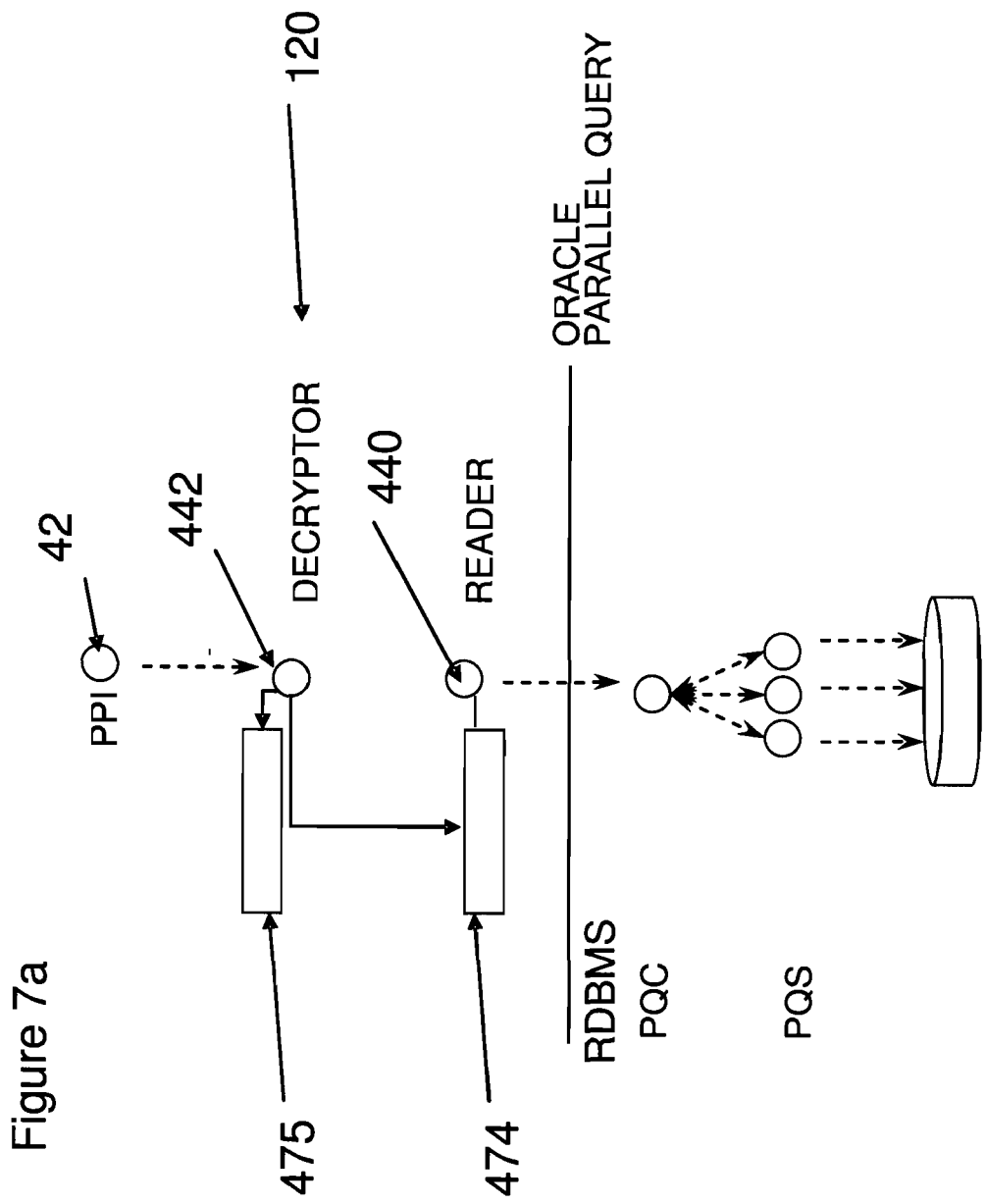
FIG. 7a is an illustration of a pipelined stack of parallel task processes of the system of FIG. 3.

FIG. 7a shows a simple stack involving a reading data process 440, a decrypting task process 442 and a parallel processing integrator 42. The reading process 440 has the full set of queues shown in FIG. 6 including an output queue 474 and the decrypting process 442 also has a fill set of queues including an output queue 475.

In use the reading process 440 reads data from the database DB using oracles parallel query processing coordinators PQC and Parallel Query Slaves PQS and populates its output queue 474 with the encrypted data read. Decrypting process 442 reads the output queue 474 decrypts the read encrypted data and enqueues it onto its output queue 475 in clear text format. Lastly parallel processing integrator 42 reads the output queue 475 and integrates the data passing the result set to the data requester which may be the user presentation layer computer UC.

Examples of tasks that may be assigned to processes 40 used in this depth pipelining manner are: reading, encrypting/decrypting, transforming and aggregating.

Reading task process performs the reading of the data from database management system RDBMS. Encrypting/Decrypting can perform decryption or encryption on data that it reads from the output queue 74 of a task process 40 lower down in the pipelining stack. Transforming can perform transformation processing on data that it reads from the output queue of a task process 40 lower down in the pipelining stack. Aggregation can perform aggregation or functional processing on data that it reads from the output queue of a process 40 lower down in the pipelining stack. Each higher level process 40 in the pipelining stack is assigned a primary output queue to read, which is the output queue of a process 40 lower down in the stack. However if the processing of the process 40 lower down the stack has completed then the process 40 will now steal from any other process 40 lower down in the stack and process the data (known as stealing described in more detail below).

The number of the integrators 42 used by system 20 is configurable with a dynamically minimum and maximum number. These numbers can be changed via human intervention or via in-built algorithms that determine the workload on the abstraction system 12 and the database management system RDBMS.

Each integrator 42 can be both directly called and given a task to process by the presentation layer UC or alternatively or additionally it will periodically interrogate the governance task queue 48.

FIG. 7b shows a slightly less simple stack 460 involving a reading data process 440, a decrypting task process 442, an aggregating task process 462 and a parallel processing integrator 42. The reading process 440 has the full set of queues shown in FIG. 6 including an output queue 474 and the decrypting process 442 and aggregating process 462 also has a full set of queues including each having an output queue 475 and 477. The integrator 42 has an output queue 56 and a task queue 52.

As an example of the stack 460 in use:

The reading process 440 reads the data from the RDBMS storage area using the RDBMS parallel query technology. The reading process 440 reads the data in batches of 50,000 (at its configured limit) directly into its output queue 474. The task of reading may have been taken from the task queue 52 of integrator 42.

The decrypting process 442 is a task processor at second level in the above stack 460 with a designated primary processing queue being the output queue 474. The decrypting process 442 reads the output queue 474 of the reading process 440, whilst the reading process 440 continues to read the data from the hard disk, in batches of 50,000, in parallel. The decrypting process 442 reads the messages from reading process 440 in a configurable batch limit (for example it could be one message or all fifty thousand messages). This is because there could be more than one process at the second level assigned to process the output queue 474. The processes at this level read encrypted data from the reading process 440 and decrypt that data placing the decrypted clear text in the output queue(s) 476.

The aggregating process 462 is a task processor at a third level in the stack 460 with a designated primary processing queue as the output queue 475 of the decrypting process 442. The aggregating process 462 reads the output queue 475, whilst the decrypting process 442 continues to read the output queue 474. The aggregating process 462 reads the messages from the decrypting process 442 in a configurable batch limit (for example it could be one message or all fifty thousand messages). This is because there could be more than one process assigned to the output queue 475. The PTP processes at this level process the output queue(s) of decrypting process 442 in a configurable batch limit and sum the amount before placing the result on the output queue 477.

The job of the integrator 42 involves the fusion of all third level processes. In this example the integrator 42 knows at the stack 460 set up that it needs to process the output queue(s) 477.

Figure 8:
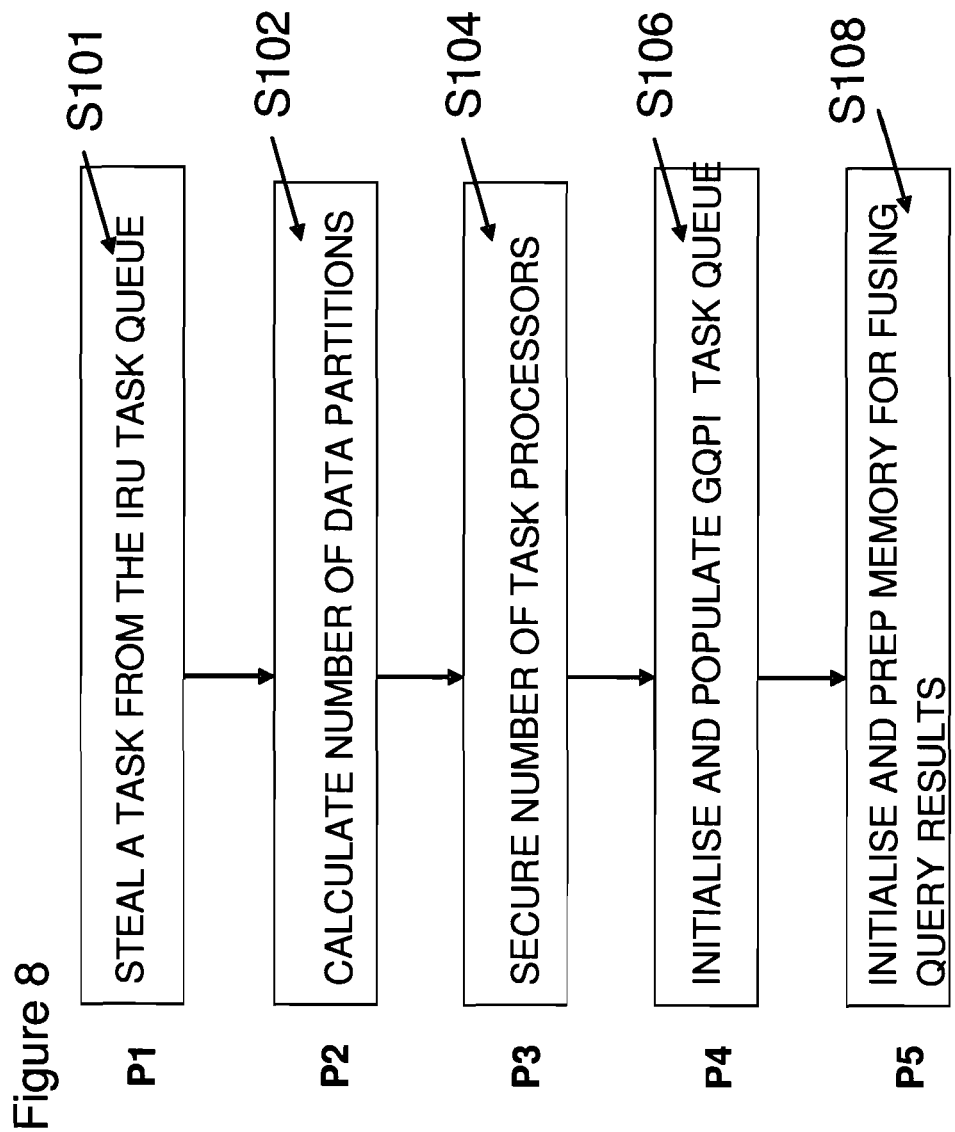
FIG. 8 is a flow chart of the process of initializing an integrator of the system of FIG. 3.

The integrator initialisation and data preparation process 100 is illustrated in FIG. 8. First at step S101 an integrator 42 steals a task 49 from the governance queue 49. During this process the stolen task 49 is removed from the governance queue 48.

Next at step S102 the integrator 42 will evaluate the task 49/tasks 53 and calculate the number of data partitions to make in the data unit DU and the number of task processes 40 to assign in order to perform parallel width and parallel depth processing to perform the task. This calculation will take into account the workload on the abstraction system 20 at this point-in-time. For instance in a banking example, the task could be to read 10,000,000 rows of encrypted transaction data and sum the amount of money deposited and the amount of money withdrawn over a 12 month period. In this case the integrator 42 might calculate that a total of ten reading processes 40 and twenty depth processes 40 in a stack will be needed to perform this operation.

Next at step S104 the system 20 secures the number of processes 40 calculated at step S102. Each integrator 42 effectively assigns the processes 40 to the integrator's 42 task 49. Each integrator 42 and associated processes 40 start communicating over a named message queues—mainly the admin queues 50/70 and the progress queues 60/80.

At step S106 the integrator populates the task queue 52, calculating and placing sub tasks 53 equivalent to task 49 into its own task queue 52. Each assigned process 40 then uses a stealing mechanism to take a task from the queue 52. If there are more tasks 53 than processes 40 allocated to the integrator 42 then those excess tasks 53 will be queued until the first available processes 40 finishes processing and steals another task from the task queue 52.

Lastly at step S108 the memory space 23 of the integrator 42 is initialized for receiving the results from the output queues 76 of processes 40 and also storing any progress data from process queues 80 into integrator progress queue 60.

When all the configured integrators 42 are busy then any new task request will be queued on the governance queue 49 and will not be processed until the first PPI finishes processing and steals the next task from the governance queue. Whenever an integrator 42 and its associated task processes 40 completes a full task 49 the integrator 42 will "steal" the next task from the governance queue 48. If more than one integrator 32 is being used then the integrator 42 may steal from queues of processes that are assigned to other integrators 42 so long as they are involved in the same processing operation.

Figure 9:
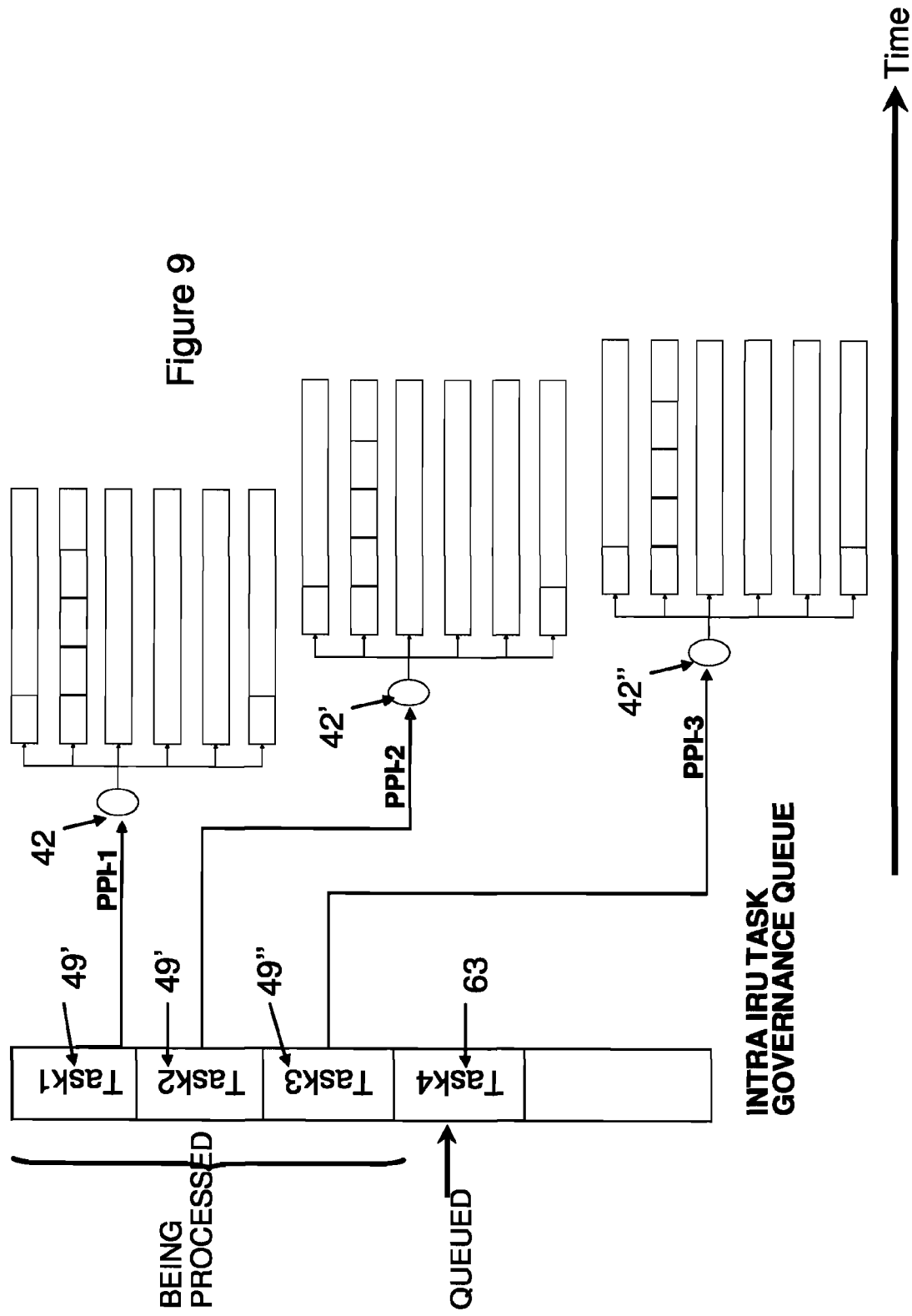
FIG. 9 is an illustration of three memory spaces of parallel processing integrators of FIG. 5.

In FIG. 9 is illustrated an example of three integrators 42 as in FIG. 5 stealing tasks from the governance queue 48. Components with a similar function are given the same reference number as in FIG. 5. In addition to integrator 42 there are two further integrators 42' and 42" with associated queues.

All three available parallel processing integrators 42, 42', 42" have been assigned a task (first task 49, second task 49' and third task 49" respectively) and are now busy processing data. Fourth task 63 is kept queued in the governance queue 48 until any of the parallel processing integrators 42, 42' and 42" becomes available. The integrators do not necessarily become available in the same sequence as the first three tasks, for instance even though parallel processing integrator 42" started processing after parallel processing integrator 42' and parallel processing integrator 42 it may process the fourth task 63 if it finished processing its task 49" first.

In addition to depth pipelining the system 20 can use multiple processes 40 in parallel with each other in width processing.

In width processing multiple reading processes 40 can act in parallel. The multiple reading processes act on different assigned portions of the database DB such as different parts of a data unit DU. Once a reading process 40 has finished reading its assigned portion it may be converted to another task such as decrypting or may read another portion of the database. Where a first portion is read by a first reading process and a second portion by a second process and the first process finished first, the first process may be assigned to also read the second process the remaining unread part of the portion being divided between the first and second process so that the read is continuous. In this case cursors will be exchanged through the cursor queues 54, 74.

Multiple encrypting/decrypting, transforming or aggregating processes 40 can be performed in parallel with other parallel task process 40 at the same level in the pipelining stack. When the decrypting parallel task process 40 has processed all the data from its assigned primary output queue 76 then the parallel task process 40 will enter a stealing phase where it will help other parallel task processes 40 process their data by stealing and processing messages from other parallel task process 40 output queues (see description with reference to FIG. 11 below).

Each integrator task queue 52 may be accessed by multiple parallel task processes 40 simultaneously. As a shared resource, the access to a task 53 in the task queue 52 is designed to be mutually exclusive. The task queue 52 is designed as a normal stack, in which case all of the available parallel task processes 40 compete at the top of the stack in order to steal a task.

A single lock is applied to guarantee the mutual exclusion. The parallel processing integrator 42 acquires the lock every time it pop/push its task queue 54 even when there is no parallel task processes 40 accessing it.

To reduce this significant performance overhead a preferable alternative embodiment uses a dequeue mechanism that requires no locking and uses pipes for communication. This technique allows the parallel processing integrator 42 to allocate tasks to its task queue 54 and then input a processing task 53 on each of the assigned parallel task processes' 40 local task queue 72. Each assigned parallel task process 40 periodically polls its local task queue 72. A communication task is sent and when the processing communication task is received from the parallel processing integrator 42 then each of the parallel task processes 40 (on a first-come-first-serve basis) will dequeue a task from the Task Queue without having to obtain a lock on that queue.

When the task is completed then all parallel task processes 40 will be unassigned from the parallel processing integrator 42 and placed into a parallel task process 40 pool. The parallel processing integrator 42 will then periodically pole the governance queue 48 and steal the next task or await a direct task request.

This mechanism will incur physical I/O and therefore in order to reduce this performance overhead a preferable alternative second mechanism "non-persistent queuing" uses a dequeue mechanism that requires no locking and uses pipes for communication. This technique allows the parallel processing integrator 42 to communicate with processes 40 by securing them to its Transaction Processing Stack (TPS) to process tasks from its task queue 54 and then input admin message on each of the assigned parallel task processes' 40 local admin queue 70. Each assigned parallel task process 40 periodically polls its local admin queue 70. When the process 70 reads the admin communication message then each of the parallel task processes 40 allocated to process integrator 42 task queue 52 (on a first-come-first-serve basis) will dequeue a task from the Task Queue without having to obtain a lock on that queue.

When the task is completed then all parallel task processes 40 will be unassigned from the parallel processing integrator 42 and placed into a parallel task process 40 pool. The parallel processing integrator 42 will then periodically pole the governance queue 48 and steal the next task or await a direct task request.

Figure 10:
FIG. 10 is a flow chart of the process of processing results.

In FIG. 10 is shown the process 120 of data processing and result sending of a parallel processing integrator 42.

At step S122 the system 20 dequeues results from the output queue 56. The output queue 56 is populated by all the outputs of the assigned parallel task processes 40 that are processing data in parallel. Each parallel task process 40 processes data and then when a configured memory limit is reached the processed results (where applicable) are eventually placed onto the output queue 56 of the parallel processing integrator 42. This is done in a parallel fashion in no specific order amongst all the assigned parallel task processes 40. The results are stored on the harddisk 24. Alternatively the results can be stored in the memory M or sent to the user computer UC.

Next at step S124 the system 20 checks the progress queue 80 of each assigned process 40 to determine the status of each of the parallel task processes 40. If one or more parallel task processes 40 have not finished processing then the parallel processing integrator 42 returns to step S122. Once it is determined that all the assigned parallel task processes have finished the process 120 moves onto to step S124.

At step S124 all of the parallel task processes 40 are unassigned and returned back to the parallel task process 40 pool and will then read all the remaining message items on the output queue 56. When some processes 40 have finished but not others the ones that have finished will try enter into stealing mode and help the processes 40 that have not finished complete their task. If this is possible they will automatically be disengage with the integrator via an admin communication into their admin queue 70 ("Cannot enter Stealing Mode"). At step S122 it is already known that the processes 40 have finished because it has received and admin communication to that effect and will go back to the process 40 pool ready to be used by other integrators 42

Next at step S126 the parallel processing integrator 42 finishes all processing on the final data saved to the hard disk 24 or memory M.

At step S128 the final processed results in the hard disk 24 or memory are sent back to the data requester whether that be another part of abstraction level system 20 or ultimately the user presentation level computer UC.

Next at step S130 process 120 reclaims the memory allocation of memory 22 utilised in processing the task request by flushing memory and deallocating all the memory that is no longer required At step S132 and S134 the integrator begins process 100 stealing the next task from the governance queue 48 or awaits a direct request from user presentation layer computer UC.

Each parallel task process 40 works in three running phases: a waiting phase, a running phase and a stealing and giving phase.

When a parallel task process 40 has been created and is in a pool of task processes 40 to be assigned a task by a parallel processing integrator 42 it enters a waiting phase. The number of parallel task processes 40 waiting in the pool is a configurable parameter. The abstraction computer system 20 will have a maximum number based on memory 22 restrictions and a minimum number which may be based on the type of queries at hand and their complexities. At the start the abstraction system 20 automatically creates the minimum number of parallel task processes 40. During the processing life cycle the total number of parallel task processes 40 can increase up to the parallel task process 40 maximum number if the query load requires them. The maximum ad minimum limits can be changed dynamically on demand or can be manually configured.

The parallel task process 40 enters a running phase when it has a populated task queue 72 and has directly been assigned a task or is in a stack and looks to another process's task queue. In this phase the parallel task process 40 performs a type of task processing, such as: data processing, decryption or reading. Task queue 72 is used for pipelining when a task at a higher level can be subdivided.

If a parallel task process 40 has finished all of the local tasks assigned to it by the parallel processing integrator 42, it then becomes a "thief" and enters into the stealing phase. Based on a stealing matrix (FIG. 11b), the process 40 in stealing phase picks one parallel task process 40 in the set of parallel task processes 40 assigned to the parallel processing integrator 42 and tries to steal a task from a specified output queue. If the stealing succeeds the process 40 in stealing phase goes back to the running phase with the stolen task; otherwise the process 40 tries to steal from another parallel task process 40 output queue 76 and will keep attempting until the termination condition for all parallel task process 40 task queues 72 are detected.

Figure 11A:
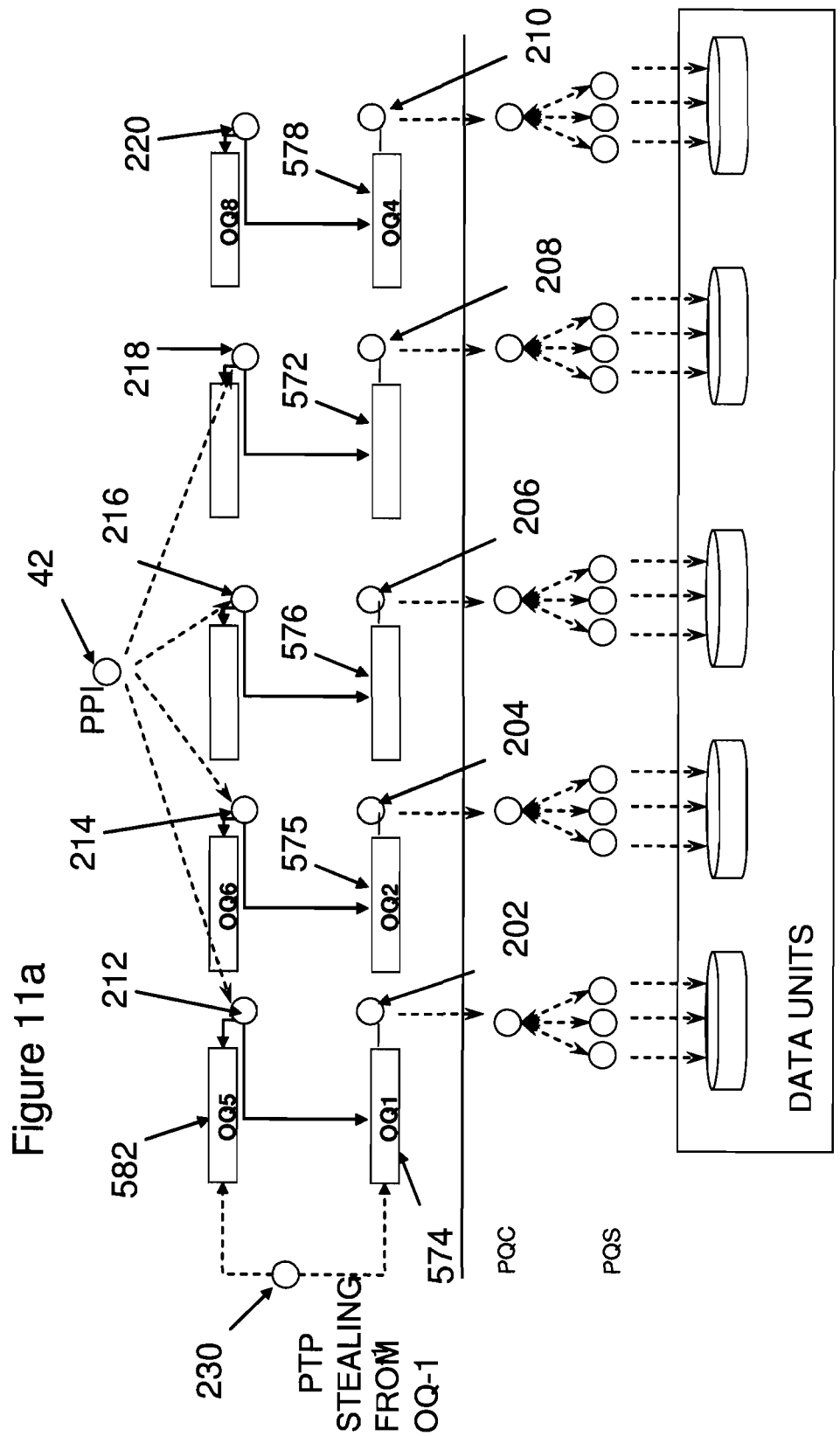
FIG. 11a is an illustration of the allocation of task processes in part of the computer system of FIG. 3.

In FIG. 11a is shown an integrator 42 with ten task processes. Five of the processes 202, 204, 206, 208, and 210 have been assigned to read from the database whilst the other five 212, 220, 214, 216 and 218 are each initially paired with one of the first five and assigned to decrypt read data in the output queues 574, 575, 576, 577, 578 of their paired reading process 202-210. Decrypted clear data is then obtained by the integrator 42 from the decryption task processors 220, 212, 214, 216 and 218 and the integrator 42 will read each of the output queues 582, 583, 584, 585 and 586 and integrate the data into the final result set.

In FIG. 11b is shown example of a stealing matrix 200 for load balancing stealing of tasks between the decrypting processes 218, 220, 212, 214 and 216. Since each process will look to its own primary output queue more often than to others the matrix 200 is found to effectively load balance.

When a parallel task process 40 has no messages to process on its primary Output Queue 76 of its paired reading process, a stealing matrix ensures that the Output Queues 64 of other slower parallel task processes 40 are emptied in a load balanced manner. In matrix 200 the output queues of the reading processes 202, 204, 206, 208 and 210 numbered 574, 575, 576, 577 and 578 respectively.

As an example when decrypting task process 212 has processed all the messages from its primary output queue 574 then it will try and steal a message from the second Output Queue in its list, which as shown in FIG. 11b is queue 575. If that queue has no messages to steal it will try and steal from output queue 576 and so on. This process continues until all reading processes 202, 204, 206, 208 and 210 confirm that they have finished processing and that there are no further messages to be processed.

If decrypting process 216 finishes processing all of the messages from its primary output queue 576 before process 218, then stealing coincides with the processing of the same queue by the process 218 that has been assigned the output queue 577 as its primary output queue. Consequently multiple decrypting processes could be reading the same output queue as its primary output queue.

When a reading process 202 has finished all its read processing and its output queue is not empty the system 20 will convert its purpose. For example it can be converted to a decrypting process and start processing its own output queue 574 in parallel with the decrypting process that has been assigned its local output queue.

Once all data has been processed for a given output queue 76 then that queue will be deleted from the stealing matrix 200 to avoid the unnecessary overhead of other processes 40 checking the queue for messages when there will be no further messages. For example if reading processes 206 has finished processing and all the messages in its local output queue have been processed, then the output queue 276 will be deleted from the matrix to prevent other processes 40 checking the queue. An example of a stealing matrix 300 with such deletions is shown in FIG. 12.

When a parallel task process 40 has been assigned to an integrator 42 and entered the running phase it is put into a persistently assigned mode. In this mode the task process 40 is attached to an integrator 42 until all processing has been completed by the integrator 42 and only then will it be released and enter the waiting phase in the parallel task process 40 pool.

A task process 40 can be made temporarily available to an integrator in a temporarily assigned mode, in a stealing phase. The task process 40 steals from the output queue 76 and performs data processing on the data and then place that data on the output queue 74 of the process 40 whose primary output queue is the output queue which has been stolen from. An example is shown in dotted lines in FIG. 11a. A task process 230 from the pool can perform the task of dequeuing messages from any of the output queues of the reading task processes 202, 204, 206, 208 and 210 then performing decryption processing on that data and finally giving the data to the output queue of decrypting process 212.

When the abstraction layer computer system 20 comprising multiple computers the integrators created long with task processes 40 be generated and managed independently by each computer with either separate load balanced governance queues 48 or a single governance queue accessible by integrators 42 of all computers.

Figure 13:
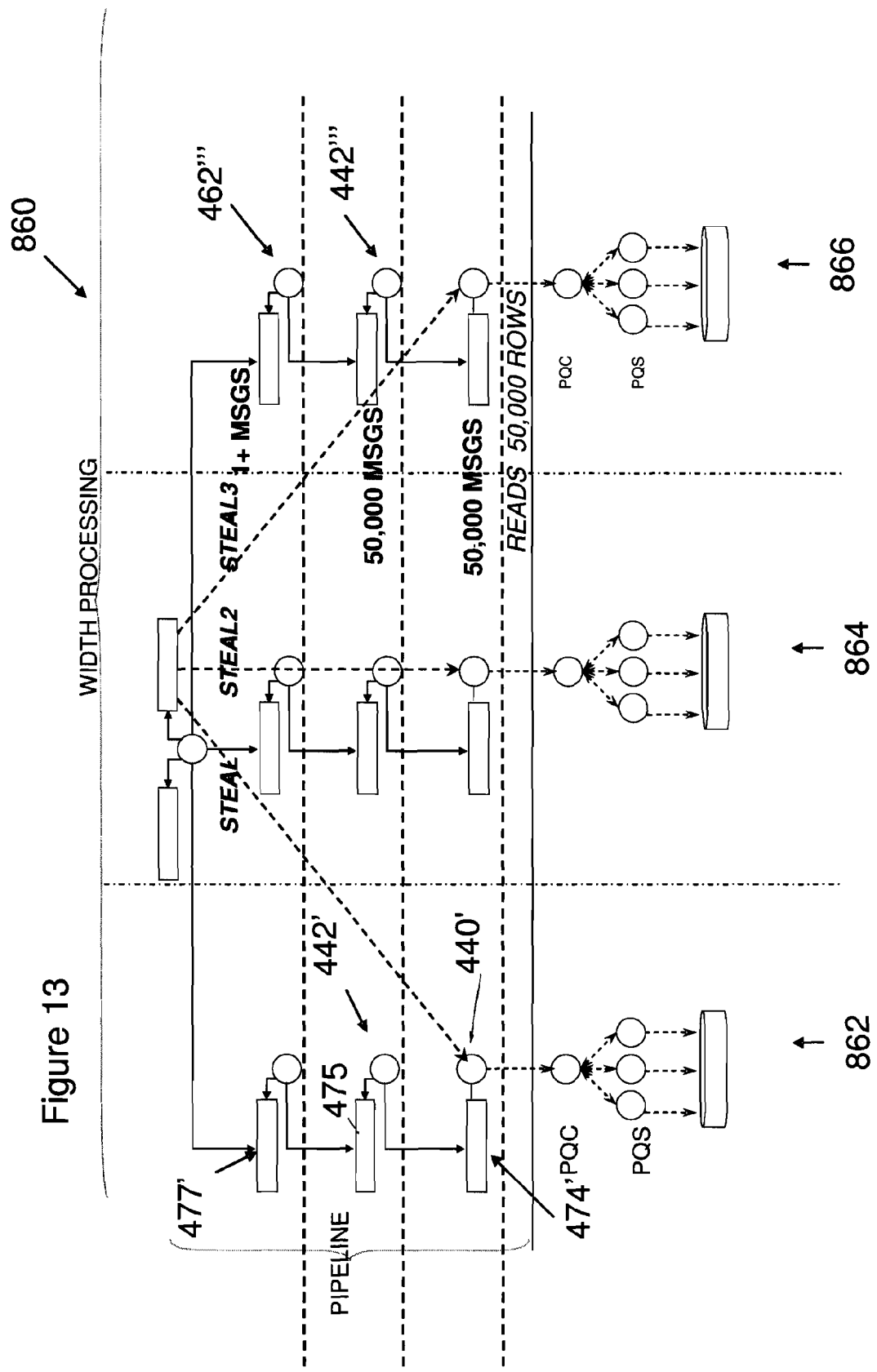
FIG. 13 is an illustration of a pipeline and width stack of parallel task processes of the system of FIG. 3.

In FIG. 13 is shown another stack at a level of parallelism using width parallelism and vertical pipelining.

Stack 860 comprise three streams 862, 864, 866 all individually substantially similar to stack 460 except they all share a common integrator 42. All of the processes 40 in each stream 862, 864 and 866 are capable of joining the other two streams. For example if all processing in finished in stream 866, then aggregating process 462''' can join stream 862 at the second level to become a decrypting process, which would process data from the output queue 474' of the reading process 440' decrypt the data and place the clear text as a message on the output queue 475 of the existing first stream 862 decrypting process 442'. At the same time third stream 866 decrypting process 442''' can join first stream 862 at the third level 3 and become a aggregating process in parallel with aggregating process 462' which reads the output queue 475' sums the data and places the result on the output queue 477'.

The design streamlines the flow of information by using intelligent processes with the RDBMS. Rather than the parallel processes remaining idle the system can intelligently allocate them to processes records as they stream from the output queues of other processes, delivering only the relevant information for each process to the higher level process 40. These techniques greatly improve the elapsed time a data processing operation takes to complete.

In stacks with many steams more than one integrator 42 may be needed. In that case a certain number of streams will be assigned to each integrator and a "master" integrator will be positioned on level above the other integrators integrating the results from each of their output queue and putting them into on output queue for access by the user computer UC.

Figure 14:
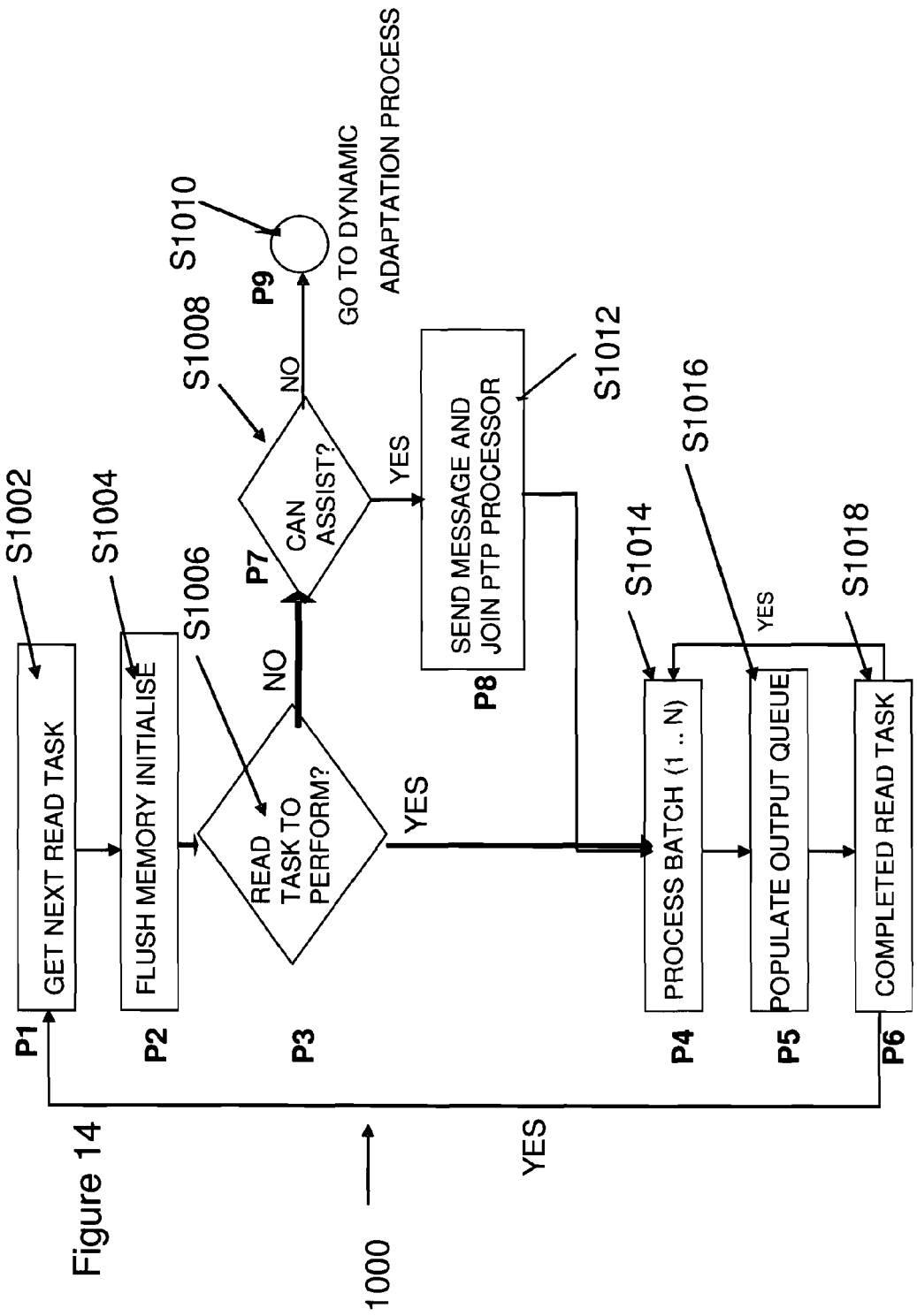
FIG. 14 is a flow diagram of the reading process.

In FIG. 14 is shown a flow chart of the method 1000 a task process 40 being assigned, and completing, the task of reading lines of data from the database DB.

Each task process is assigned a position, by an integrator 42, in the Task Processing Stack (TPS). Every task process 40 to become a reading process can be directly called and given a task to process by the integrator 42. Alternatively at step S1002 the task process 40 can interrogate the task queue 52 of the integrator 42.

Next at step S1004 the processing unit 24 flushes the memory 25 of the process 40 of any residual data and initialises all the queues of memory space 24 for receiving the results from the read for a query and to storing any progress data, etc.

At step S1006 it is checked whether step S1002 leads to the acquisition of a reading task. If the answer is yes the method 1000 proceeds to step S1014. If no task was acquired (because the task queue 52 contained no reads) then at step S1008 it is determined whether there are other reading processes that can be assisted. If there are then process proceeds to step S1012 but if not then at step S1010 the task process 40 enters a stealing mode and tries to dynamically convert itself using its pre-programmed code to another type of process such as a decryptor or aggregator to help other task processes at the same or higher levels in its stack within the same stream or alternatively join other task processes at other levels in the stack in other streams within the same processing operation.

At step S1012 the process 40 sends an "AVAILABLE" message onto the admin queue 50 of the integrator. By reading its admin queue 50 identifies, that process 40 is available and that there are other PTP processors reading. In a preferred form this can be identified by the integrator 42 storing data specifying which processes were assigned which tasks and inferring that a process is still assigned to its initial task if there has been no contrary message on its admin queue 52 from a particular process. Once a process has been reassigned this information can be used to update its stored data specifying process assignment.

After reading the admin queue 50 the integrator 42 communicates back which PTP processes 40 are actively reading and which should be assisted first (by checking the progress queues 80 of each) and the available process 40 sends a message to the admin queue 70 of the reading process to be assisted that it will join in its reading activity.

Next the read task begins. At step S1014 the process 40 interfaces with the RDBMS's parallel query technology i.e. with a at least one parallel query coordinator PQC and uses it to stream a configurable batch limit of data into the memory space 25.

At step S1016 the process 40 populates its output queue 76. If the data is being processed into the output queue 76 faster than the higher level task processes are processing the data then additional task processes can be assigned to the upper levels or multiple output queues can be used. This is dependant on the resource utilisation within the environment.

The final step S1018 checks to see if all the assigned data has been read, if that is the case then method 1000 returns to step S1002. If not all of the data has been read then the process 40 returns to step S1014 and reads the next batch of data from the database DB until the final row has been retrieved.

Figure 15:
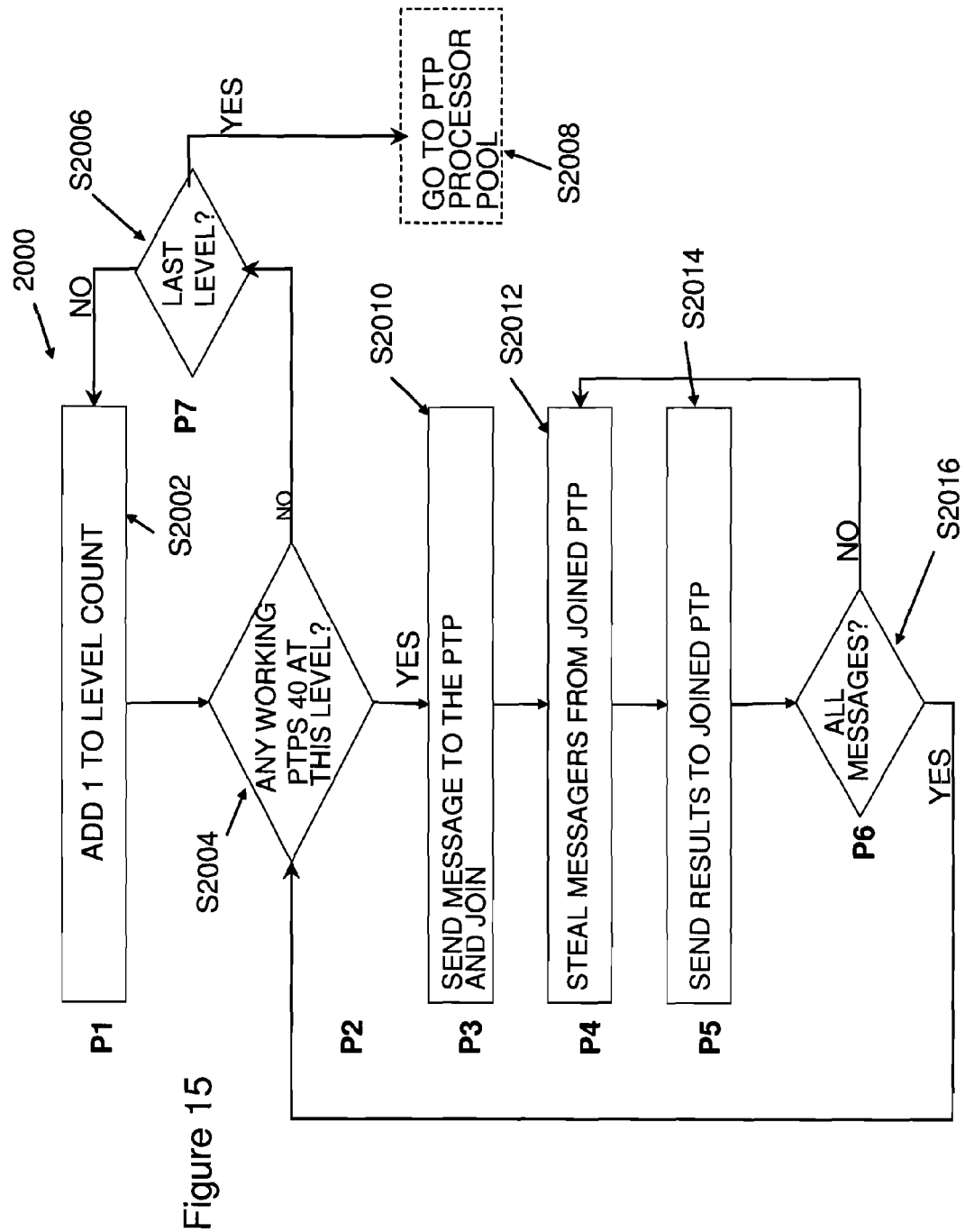
FIG. 15 is a flow diagram of the stealing process.

In FIG. 15 is shown a flow chart of the method 2000 of a task process 40 entering a stealing mode and dynamically adapting to join another task process.

A task process 40 can enter the method 2000 in two main ways:

Firstly when all the activities at the current level in the stack have been completed and the process 40 is looking to process data for other task processes involved in the data processing operation within a stream(s) of the stack.

Secondly when process 40 is idle in the task process pool and can be temporarily assigned to a stack until a new data request is placed on the governance queue 48.

First at step S2002 the Level count in the process 40 can be initialised at 0 or 1 depending on whether the temporary assignment is for reading or other tasks further up the processing stack At step S2004 it is evaluated if there are any active task processes at the level in the stack specified by step S1002. This is achieved by sending a message to the integrator 42, admin queue 50 requesting information on the progress of task processes at this level. After checking the progress queues 80 the integrator 42 sends a candidate for joining or a list of candidates for joining to the admin queue 70 of process 40. If there are candidate(s), then the method 2000 moves to step S2010, whereas if there are no other task processes that are active and can be joined at this level then the process moves to step S2006.

At step S2006 it is evaluated if the level is the last level in the stack, if it is and there are no further data processing tasks to perform then at step S2008 process 40 is released back into the task process processing queue, whereas if it is not the highest level then the process returns to step S2002 where 1 is added to the level count and the method 200 continues as before.

At step S2010 the task process 40 makes itself available to a candidate(s) by sending an "AVAILABLE" message on each of the candidate(s) admin queues 70. One or more of the candidates will respond and the task process 40 will be joined to the candidate(s) process.

Next at step S2012 if the process 40 is assigned a read it acts as in method 100 above. If not it steals a batch limit of messages the output queue of the process on a lower level to which the joined candidate task process is assigned (if more than one candidates this can be done on a round robin basis) and works on the data defined by the candidate process joined, for instance decryption or aggregation. The pre-programmed code is used so that it can easily convert from one type of task to another.

Next at step S2014 the process 40 places the result set of the task on the output queue 76 of the candidate task process.

Lastly at step S2016 it is evaluated whether all messages on the primary input queue of the joined candidate(s) has been completed. If all messages have been processed then the method 2000 goes back to step S2004. If there are messages still to be processed then the method 200 goes back to step S2010 and steals another batch limit of messages from the joined candidate(s).

The number of messages in each batch in the steps S212 through S2016 is configurable by the system 10. For example if there are fifty thousand messages, a batch may comprise a number between one and fifty thousand. The number chosen will be the number that is most efficient and will vary depending on the application. If the number is wished to be changed to increase efficiency this can be done by sending relevant instructions to the admin queue of process 40. This could be done for example based on knowledge or on trial and error monitoring the speed at which different types of queries produce complete result sets for different settings.

Figure 16A:
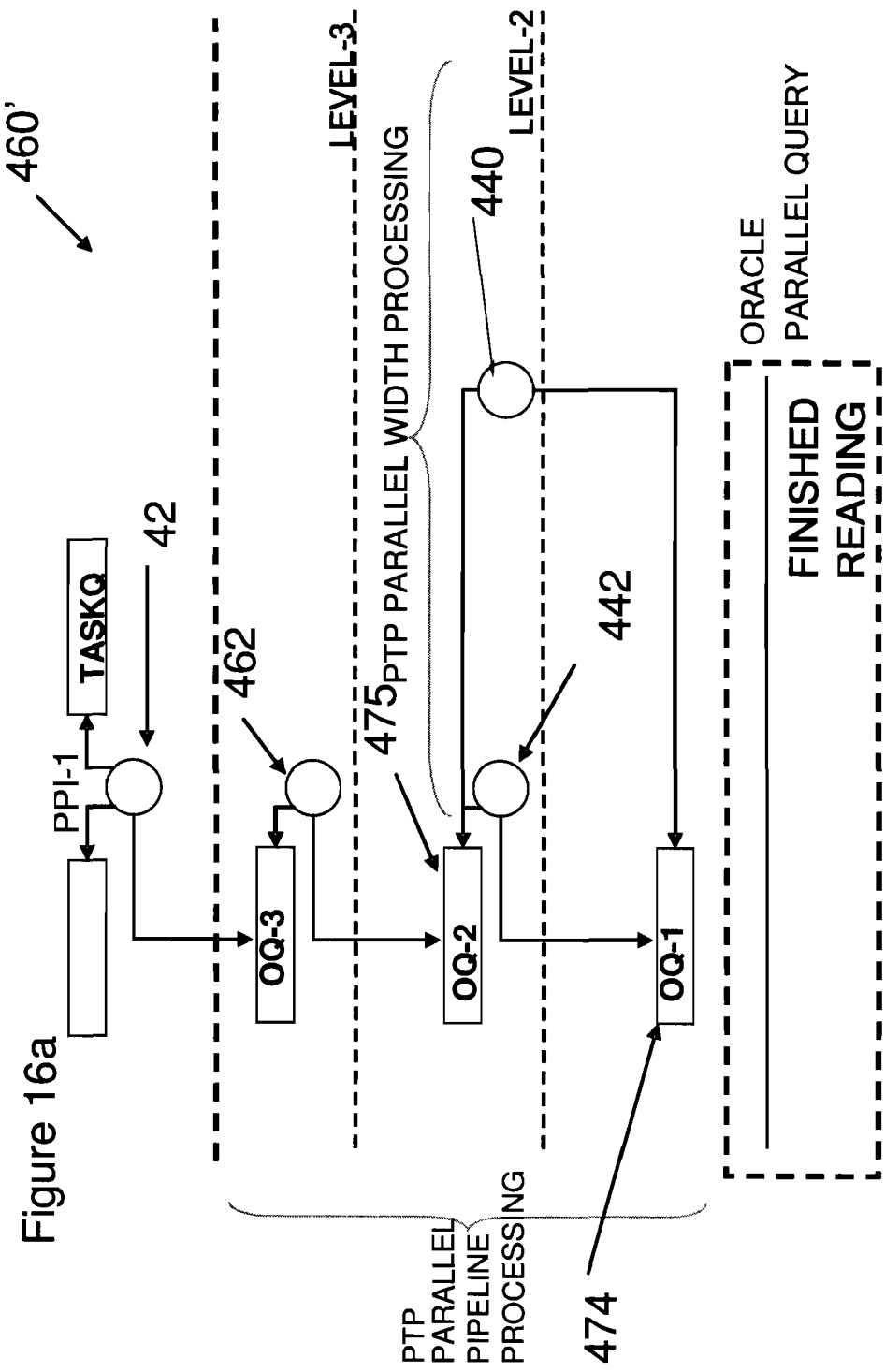
FIG. 16a is an example of the effect of method 2000 on the positioning of a task process 440 within stack/stream 460.
Figure 16B:
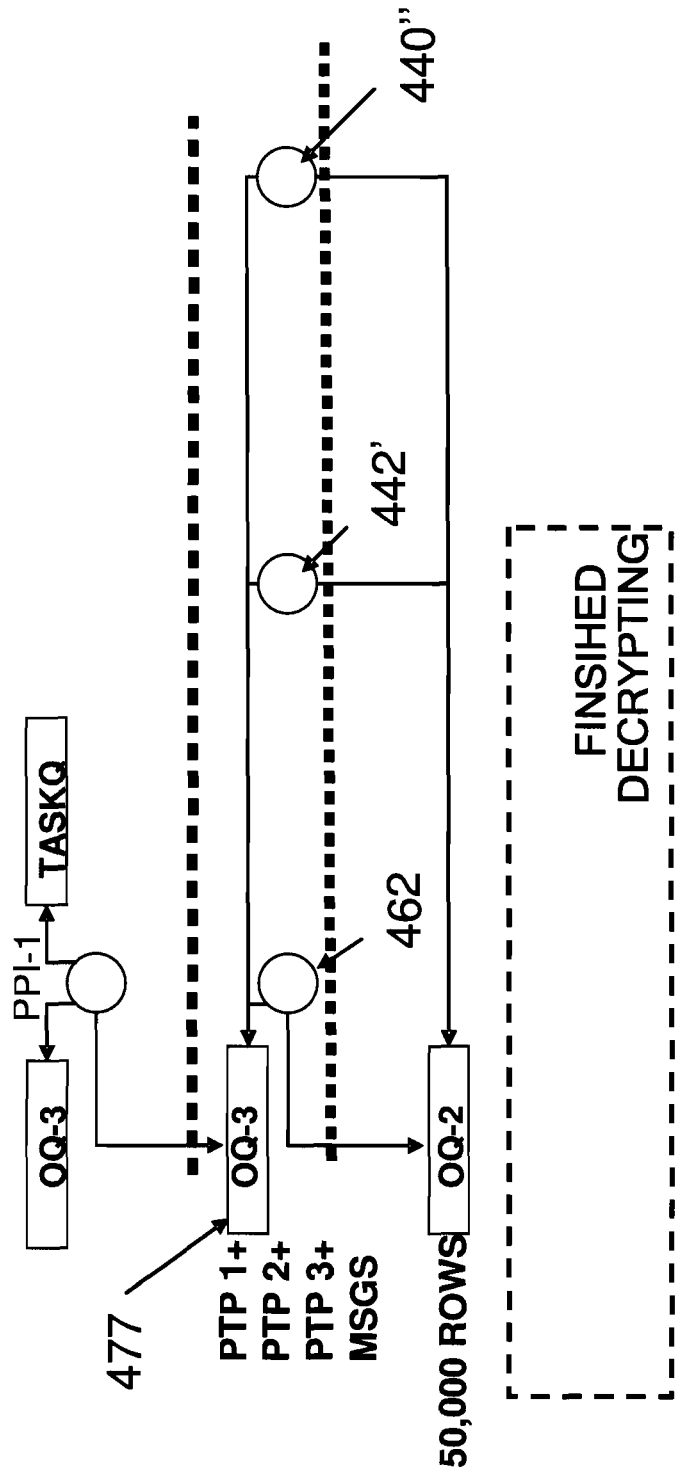
FIG. 16b is an example of the effect of method 2000 on the positioning of a task process 440 within stack/stream 460.

In FIG. 16a and 16b is shown an example of the effect of method 2000 on the positioning of a task process 440 within stack/stream 460.

In FIG. 16a is shown the stack (denoted 460') after the reading task has been finished. The stack 460' is substantially the same as stack 460 illustrated during reading in FIG. 7b, except that the stack 460' Is no longer in direct contact with the RDBMS and that the reading process 440 has become a second decrypting process 440'. Second encrypting process 440' has moved from the first level to the second level, is now instructed to use the decrypting rather than reading parts of it pre-programmed code and rather than access and now shares works on messages from its old output queue 474. The data in output queue 474 may have been moved from the memory space 25 of process 440/440' to elsewhere in the memory M.

In an example where there were fifty thousand rows of data to be read the output queue 474 may contain fifty thousand messages corresponding to fifty thousand rows of encrypted text. Since there are now two decrypting processes 440' and 442 reading the same queue.

Process 440' places its results (messages corresponding lines of clear text) in output queue 475 of process 442.

Once all 50,000 messages in output queue 474 have been decrypted method 2000 may change stack 460' to stack 450" shown in FIG. 16b. Here first decrypting process 442 has converted to a second aggregating process 442' and process 440' has been converted to a third aggregating process 440". All three aggregating processes 462, 442' and 440" the messages of clear text from output queue 475 and places results into output queue 477. When there are no messages left in queue 475 each of the processes 462, 442' and 440" can join the process pool.

The ability to convert processes from one task to another is advantageous over creating and destroying them based on need. Whilst a process that contains code for all types of task takes up slightly more memory than one coded only for a specific task it will still normally take up a very small amount of the memory available whereas the processing power to convert a process can be several magnitudes less than to create a new one.

The invention claimed is:

1. Computer apparatus for use with a database management system and database, the computer apparatus comprising a processor and a memory, the computer apparatus configured to provide a first task process and a second task process, each task process being apportioned a different section of the memory when in use, wherein the computer apparatus is configured to respond to the database management system, the computer apparatus being instructed to carry out a first task and a second task in series on a section of data, by:
(a) instructing the first task process to begin the first task on a first part of the section of data in the database, and (b) after the first task process on the first part of the section of the data is complete, instructing:
  (i) the second task process to carry out the first task on a second part of the section of data which begins where the first part ends, and switching the first task process to carry out the second task on the first part of the section of data on which the first task has already been carried out, or
  (ii) the second task process to carry out the second task on the first part of the section of data on which the first task has already been carried out whilst the first task process is switched to carry out the first task on the second part of the data, or
  (iii) the second task process to carry out the first task on the second part of the section of data whilst the first task process is switched to pipeline the second task to a third task process, or
  (iv) the first task process to carry out the first task on a second part of the section of data and the second task process is instructed to pipeline the second task to a third task process;
wherein each task process has a task queue of tasks, the processor defines a governance queue comprising a list of tasks which the database management system has been instructed to carry out, the processor configured to assign tasks from the governance queue to the task queue of the first task process, the governance queue comprising the first and second tasks on the first part of the section of data, and when the first task has been carried out the first task process is configured to check its task queue and carry out the next task listed.

2. Computer apparatus for use with a database management system and database, the computer apparatus comprising a processor and a memory, the computer apparatus configured to provide a first task process and a second task process, each task process being apportioned a different section of the memory when in use, wherein the computer apparatus is configured to respond to the database management system, the computer apparatus being instructed to carry out a first task and a second task in series on a section of data, by:
(a) instructing the first task process to begin the first task on a first part of the section of data in the database, and (b) after the first task process on the first part of the section of the data is complete, instructing:
  (i) the second task process to carry out the first task on a second part of the section of data which begins where the first part ends, and switching the first task process to carry out the second task on the first part of the section of data on which the first task has already been carried out, or
  (ii) the second task process to carry out the second task on the first part of the section of data on which the first task has already been carried out whilst the first task process is switched to carry out the first task on the second part of the data, or
  (iii) the second task process to carry out the first task on the second part of the section of data whilst the first task process is switched to pipeline the second task to a third task process, or
  (iv) the first task process to carry out the first task on a second part of the section of data and the second task process is instructed to pipeline the second task to a third task process;
wherein the processor defines a governance queue comprising a list of tasks which the database management system has been instructed to carry out, the processor configured to assign tasks from the governance queue to the first task process, the governance queue comprising the first and second tasks on the first part of the section of data.

3. A computer apparatus according to claim 2 wherein each task process has a task queue of tasks, the processor configured to assign tasks from the governance queue to the task queue of one or more task processes, one or more task processes are configured to split an assigned task into a plurality of smaller tasks, work on one smaller task and store the others in its task queue, and when a task has been carried out by any of the task processes, that task process is configured to check its task queue and carry out the next task listed including any smaller tasks.

4. A computer apparatus according to claim 3 wherein the apparatus is configured to use the section of code corresponding to the task to be undertaken, wherein when the first task process is switched to carry out the second task, a different section of code of the first task process is used.

5. A computer apparatus according to claim 2 wherein each task process has a task queue of tasks, the processor configured to assign tasks from the governance queue to the task queue of one or more task processes, one or more task processes are configured to split an assigned task into a plurality of smaller tasks, work on one smaller task and store the others in its task queue, and when a task has been carried out by a process, that process is configured to check the task queue of another process and carry out the next task listed in that queue including any smaller tasks.

6. A computer apparatus according to claim 2 wherein the processor configured to assign tasks from the governance queue to the task queue of one or more task processes, and when a task has been carried out by a process, that process is configured to check the governance queue and carry out the next task listed in that queue including any smaller tasks.

7. A computer apparatus according to claim 2 wherein when a task has been carried out by a process, the apparatus is configured to instruct that process whether it should check its task queue, the task queue of another process or the governance queue or to instruct which order those queue should be checked in, the process checking the next in order if there are no tasks listed.

8. Computer apparatus for use with a database management system and database, the computer apparatus comprising a processor and a memory, the computer apparatus configured to provide a first task process and a second task process, each task process being apportioned a different section of the memory when in use, wherein the computer apparatus is configured to respond to the database management system, the computer apparatus being instructed to carry out a first task and a second task in series on a section of data, by:
 (a) instructing the first task process to begin the first task on a first part of the section of data in the database, and (b) after the first task process on the first part of the section of the data is complete, instructing:
  (i) the second task process to carry out the first task on a second part of the section of data which begins where the first part ends, and switching the first task process to carry out the second task on the first part of the section of data on which the first task has already been carried out, or
  (ii) the second task process to carry out the second task on the first part of the section of data on which the first task has already been carried out whilst the first task process is switched to carry out the first task on the second part of the data, or
  (iii) the second task process to carry out the first task on the second part of the section of data whilst the first task process is switched to pipeline the second task to a third task process, or
  (iv) the first task process to carry out the first task on a second part of the section of data and the second task process is instructed to pipeline the second task to a third task process;
 wherein each task process uses a cursor to indicate which data it has performed its task on and which data it has not and each task process comprises a cursor queue, configured to indicate the cursor position at least one set time, and wherein the another process when instructed to carry out a similar type of task on the same section of data or results, reads the cursor queue of the process and the another process starts its task from the position at which the process's cursor stopped, wherein the first task process uses a cursor to indicate which data has been read and which has not and the first task process comprises a cursor queue, configured to indicate when the first part of the section of data has been read where the first part of the data ends and the second part starts, and the second task process when instructed to read the second part of the same section of data, reads the cursor queue of the first task process and starts reading from the position at which the cursor of first task process cursor stopped.

9. Computer apparatus for use with a database management system and database, the computer apparatus comprising a processor and a memory, the computer apparatus configured to provide a first task process and a second task process, each task process being apportioned a different section of the memory when in use, wherein the computer apparatus is configured to respond to the database management system, the computer apparatus being instructed to carry out a first task and a second task in series on a section of data, by:
 (a) instructing the first task process to begin the first task on a first part of the section of data in the database, and (b) after the first task process on the first part of the section of the data is complete, instructing:
  (i) the second task process to carry out the first task on a second part of the section of data which begins where the first part ends, and switching the first task process to carry out the second task on the first part of the section of data on which the first task has already been carried out, or
  (ii) the second task process to carry out the second task on the first part of the section of data on which the first task has already been carried out whilst the first task process is switched to carry out the first task on the second part of the data, or
  (iii) the second task process to carry out the first task on the second part of the section of data whilst the first task process is switched to pipeline the second task to a third task process, or
  (iv) the first task process to carry out the first task on a second part of the section of data and the second task process is instructed to pipeline the second task to a third task process;
 wherein: each process comprises code for performing a plurality of different tasks, including the first and second tasks, and when a task has been carried out by a task process, the code of the task process is used to instruct that process whether it should check its task queue, the task queue of another process or the governance queue or to instruct which order those queue should be checked in, the process checking the next in order if there are no tasks listed.

10. Computer apparatus for use with a database management system and database, the computer apparatus comprising a processor and a memory, the computer apparatus configured to provide a first task process and a second task process, each task process being apportioned a different section of the memory when in use, wherein the computer apparatus is configured to respond to the database management system, the computer apparatus being instructed to carry out a first task and a second task in series on a section of data, by:

(a) instructing the first task process to begin the first task on a first part of the section of data in the database, and (b) after the first task process on the first part of the section of the data is complete, instructing:

(i) the second task process to carry out the first task on a second part of the section of data which begins where the first part ends, and switching the first task process to carry out the second task on the first part of the section of data on which the first task has already been carried out, or (ii) the second task process to carry out the second task on the first part of the section of data on which the first task has already been carried out whilst the first task process is switched to carry out the first task on the second part of the data, or (iii) the second task process to carry out the first task on the second part of the section of data whilst the first task process is switched to pipeline the second task to a third task process, or (iv) the first task process to carry out the first task on a second part of the section of data and the second task process is instructed to pipeline the second task to a third task process;

wherein: each task process comprises an administration queue, each task process is configured to check its administration queue for instructions, and the apparatus is configured to send instructions to the administration queue of a task process when the task process is to be switched from a first task to a different task, the process configured so that on reading such instructions in its administration queue it switches to the different type of or wherein the apparatus is configured to send instructions to the administration queue of a task process when it is to be switched from working on a first part or section of data to a second part or section of data, the process configured so that on reading such instructions in its administration queue it switches the part or section of data on which it is working.

11. Computer apparatus for use with a database management system and database, the computer apparatus comprising a processor and a memory, the computer apparatus configured to provide a first task process and a second task process, each task process being apportioned a different section of the memory when in use, wherein the computer apparatus is configured to respond to the database management system, the computer apparatus being instructed to carry out a first task and a second task in series on a section of data, by:

(a) instructing the first task process to begin the first task on a first part of the section of data in the database, and (b) after the first task process on the first part of the section of the data is complete, instructing:

(i) the second task process to carry out the first task on a second part of the section of data which begins where the first part ends, and switching the first task process to carry out the second task on the first part of the section of data on which the first task has already been carried out, or (ii) the second task process to carry out the second task on the first part of the section of data on which the first task has already been carried out whilst the first task process is switched to carry out the first task on the second part of the data, or (iii) the second task process to carry out the first task on the second part of the section of data whilst the first task process is switched to pipeline the second task to a third task process, or (iv) the first task process to carry out the first task on a second part of the section of data and the second task process is instructed to pipeline the second task to a third task process;

wherein a queue of each task process displays an available message when the task it is working on has been completed, and the apparatus is configured to provide a master administration queue associated with the governance queue, each task process sends an available message from that task process to the master administration queue when the task it is working on has been completed, the processor reads an available message from the queue and switches the task process to work on a task in parallel with another task that has already commenced work on the another task.

12. A computer apparatus according to claim 11 wherein a plurality of task processes comprise a progress queue which indicates the progress made by the task process on the task on which it is working, the apparatus is configured to determine which specific task to switch a task process signalled as available to, depending on the information in at least two progress queues of other task processes by switching to the task of a process that is less progressed in its.

13. A computer apparatus according to claim 11 wherein a task process signalled as available is sent a task from the governance queue.

14. Computer apparatus for use with a database management system and database, the computer apparatus comprising a processor and a memory, the computer apparatus configured to provide a first task process and a second task process, each task process being apportioned a different section of the memory when in use, wherein the computer apparatus is configured to respond to the database management system, the computer apparatus being instructed to carry out a first task and a second task in series on a section of data, by:

(a) instructing the first task process to begin the first task on a first part of the section of data in the database, and (b) after the first task process on the first part of the section of the data is complete, instructing:

(i) the second task process to carry out the first task on a second part of the section of data which begins where the first part ends, and switching the first task process to carry out the second task on the first part of the section of data on which the first task has already been carried out, or (ii) the second task process to carry out the second task on the first part of the section of data on which the first task has already been carried out whilst the first task process is switched to carry out the first task on the second part of the data, or (iii) the second task process to carry out the first task on the second part of the section of data whilst the first task process is switched to pipeline the second task to a third task process, or (iv) the first task process to carry out the first task on a second part of the section of data and the second task process is instructed to pipeline the second task to a third task process;

wherein: each task process comprises an administration queue, each task process is configured to check its administration queue for instructions, each process has an output queue in to which it outputs results of carrying out its task, the apparatus is configured to instruct a process to work on results from the output queue of another process wherein data comprises output results of carrying out a task, and the processes are organised into levels of processes, the one or more process in the lowest level working on data in the database and/or from the database management system and the one or more process in higher levels working on results in the output queue of a process in a lower level, so that task processes pipeline tasks.

15. A computer apparatus according to claim 14 wherein the processes are assigned a similar type of task as processes on the same level and different to the type of task of task processes on a different level.

16. A computer apparatus according to claim 14 wherein the apparatus is configured to check each level for tasks for an available task process to assist another task process with in parallel and only checking the next level if there are no uncompleted tasks or sufficiently under progressed tasks.

* * * * *